United States Patent
Ju et al.

(10) Patent No.: US 11,567,257 B2
(45) Date of Patent: **\*Jan. 31, 2023**

(54) LAMP, LAMP SYSTEM, METHOD FOR ASSEMBLING LAMP SYSTEM, AND METHOD FOR DISASSEMBLING LAMP SYSTEM

(71) Applicants: Radiant Opto-Electronics (Suzhou) Co., Ltd., Jiangsu (CN); Radiant Opto-Electronics Corporation, Kaohsiung (TW)

(72) Inventors: Chih-Hung Ju, Kaohsiung (TW); Cheng-Ang Chang, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,052

(22) Filed: May 5, 2021

(65) Prior Publication Data

US 2021/0254801 A1    Aug. 19, 2021

Related U.S. Application Data

(63) Continuation of application No. PCT/CN2020/085417, filed on Apr. 17, 2020.

(30) Foreign Application Priority Data

Apr. 23, 2019 (WO) ............... PCT/CN2019/083861

(51) Int. Cl.
*F21V 8/00* (2006.01)
*F21S 8/06* (2006.01)
(Continued)

(52) U.S. Cl.
CPC ............ *G02B 6/0095* (2013.01); *F21S 2/005* (2013.01); *F21S 8/061* (2013.01); *F21V 23/06* (2013.01);
(Continued)

(58) Field of Classification Search
CPC ..... G02B 6/0078; G02B 6/0095; F21V 23/06; F21S 8/061; F21S 2/005
See application file for complete search history.

(56) References Cited

U.S. PATENT DOCUMENTS 5,282,600 A    2/1994   Weiss et al.
10,126,486 B2  11/2018  Ju et al.
(Continued)

FOREIGN PATENT DOCUMENTS

CN    101900270 A    12/2010
CN    102252180 A  * 11/2011  ............... F21K 9/61
(Continued)

*Primary Examiner* — Anabel Ton
(74) *Attorney, Agent, or Firm* — CKC & Partners Co., LLC

(57) ABSTRACT

A lamp, a lamp system, a method for assembling a lamp system, and a method for disassembling a lamp system are provided. The lamp includes frame body, fixing mechanism, light guide plate, light source, electrical connecting assembly and suspension member. The fixing mechanism has a side surface, a top surface and a groove, and the groove extends from the side surface to the top surface. The groove has a first end and a second end respectively on the side surface and the top surface. The light guide plate, the light source and the fixing mechanism are disposed on the frame body. The electrical connecting assembly is disposed on the frame body. The electrical connecting assembly is connected to the light source to form an electrical loop. One end of the suspension member is passed through the groove from the first end and is positioned in the second end.

19 Claims, 21 Drawing Sheets

(51) Int. Cl.
*F21S 2/00* (2016.01)
*F21V 23/06* (2006.01)
*F21Y 115/10* (2016.01)

(52) U.S. Cl.
CPC ......... *G02B 6/0078* (2013.01); *G02B 6/0088* (2013.01); *F21Y 2115/10* (2016.08)

(56) References Cited

U.S. PATENT DOCUMENTS

| | | | |
|---|---|---|---|
| 10,247,373 B1 * | 4/2019 | Ladewig | ............... F21V 23/001 |
| 10,725,231 B2 | 7/2020 | Ross et al. | |
| 10,935,308 B2 | 3/2021 | Fei et al. | |
| 2002/0118537 A1 | 8/2002 | Segretto | |
| 2004/0114361 A1 | 6/2004 | Severtson et al. | |
| 2015/0338053 A1 * | 11/2015 | Rector | ...................... F21V 5/02 |
| | | | 362/224 |
| 2017/0002990 A1 | 1/2017 | O'Brien et al. | |
| 2020/0116342 A1 * | 4/2020 | Ju | ......................... F21V 21/005 |
| 2021/0071832 A1 * | 3/2021 | Gomez Martinez | .. F21V 21/008 |
| 2021/0141149 A1 | 5/2021 | Nijkamp et al. | |
| 2021/0231862 A1 * | 7/2021 | Ju | ......................... F21V 23/06 |

FOREIGN PATENT DOCUMENTS

| | | | |
|---|---|---|---|
| CN | 202026101 U | 11/2011 | |
| CN | 102410452 A | 4/2012 | |
| CN | 102454904 A * | 5/2012 | ............. F21S 2/005 |
| CN | 202253153 U | 5/2012 | |
| CN | 102913828 A | 2/2013 | |
| CN | 203848139 U | 9/2014 | |
| CN | 104329602 A | 2/2015 | |
| CN | 104641166 A | 5/2015 | |
| CN | 204479882 U | 7/2015 | |
| CN | 104879687 A | 9/2015 | |
| CN | 104879699 A | 9/2015 | |
| CN | 204943211 U | 1/2016 | |
| CN | 205079122 U | 3/2016 | |
| CN | 205877948 U | 1/2017 | |
| CN | 106537020 A | 3/2017 | |
| CN | 106885186 A | 6/2017 | |
| CN | 107062103 A | 8/2017 | |
| CN | 107314327 A | 11/2017 | |
| CN | 107388114 A | 11/2017 | |
| CN | 107842720 A | 3/2018 | |
| CN | 107842786 A | 3/2018 | |
| CN | 107917373 A | 4/2018 | |
| CN | 108286687 A | 7/2018 | |
| CN | 207569629 U | 7/2018 | |
| CN | 108386778 A | 8/2018 | |
| CN | 108518627 A | 9/2018 | |
| DE | 20005623 U1 | 3/2001 | |
| GB | 563224 A | 8/1944 | |
| KR | 20000058761 A | 10/2000 | |
| TW | 201616042 A | 5/2016 | |
| TW | M558872 U | 4/2018 | |
| WO | 2014135555 A1 | 9/2014 | |
| WO | 2020073637 A1 | 4/2020 | |

* cited by examiner

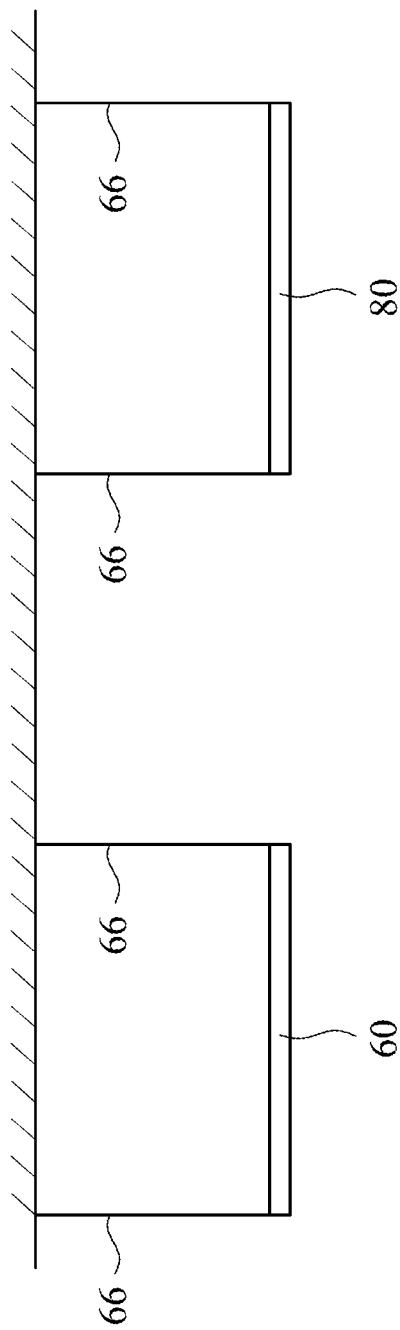

US 11,567,257 B2

LAMP, LAMP SYSTEM, METHOD FOR ASSEMBLING LAMP SYSTEM, AND METHOD FOR DISASSEMBLING LAMP SYSTEM

RELATED APPLICATIONS

This application is a continuation application of International Application No. PCT/CN2020/085417 filed on Apr. 17, 2020, which claims priority to International Application No. PCT/CN2019/083861, filed on Apr. 23, 2019. The entire disclosures of all the above applications are hereby incorporated by reference.

BACKGROUND

Field of Invention

The present disclosure relates to an illuminating device. More particularly, the present disclosure relates to a lamp, a lamp system, a method for assembling lamp system, and a method for disassembling lamp system.

Description of Related Art

Lamps become more diversified to meet market requirements. One of conventional lamps is a hanging transparent lamp which can achieve better appearance and illumination.

However, most of hanging transparent lamps use externally exposed wires to connect to a power supply. Such externally exposed wires not only have complicated assembling processes and high manufacturing cost, but also result in a messy visual effect in a space.

In particular, when multiple transparent lamps are need to be connected in series, because each of the transparent lamps has an outer frame, light-emitting surfaces of the lamps are not continuously connected, thus resulting in inconsistent and non-aesthetic appearance as well as occurring partial dark areas on the light-emitting surfaces.

SUMMARY

One object of the present invention is to provide a lamp that can be rapidly assembled and disassembled according to a frame design of the lamp.

According to the aforementioned object, a lamp is provided. The lamp includes a frame body, at least one fixing mechanism, at least one light guide plate, at least one light source, an electrical connecting assembly and at least one suspension member. The frame body has an accommodating space. The fixing mechanism is disposed on the frame body, in which the fixing mechanism has a side surface, a top surface and a groove, and the groove extends from the side surface to the top surface. The groove has a first end and a second end, and the first end is located on the side surface, and second end is located on the top surface. The light guide plate is disposed in the accommodating space. The light source is disposed adjacent to a light-incident surface of the light guide plate. The electrical connecting assembly is disposed on the frame body. The electrical connecting assembly is connected to the light source to form an electrical loop. At least one end of the suspension member is passed through the groove from the first end which is located on the side surface of the fixing mechanism and is positioned in the second end which is located on the top surface of the fixing mechanism.

According to an embodiment of the present invention, the groove of the fixing mechanism includes a first sub groove and a second sub groove. The first sub groove extends from the first end on the side surface along a first direction to a junction between the side surface and the top surface. The second sub groove extends from the second end on the top surface along a second direction to the junction. The first direction is perpendicular to the second direction, and the first sub groove and the second sub groove are communicated with each other at the junction.

According to an embodiment of the present invention, only a portion of the light guide plate which is near the light-incident surface is located in the accommodating space, and the portion is covered by the frame body.

According to an embodiment of the present invention, a limiting block is disposed on the at least one end of the suspension member. A width of the first end of the groove is greater than a width of the limiting block, and a width of the second end of the groove is smaller than the width of the limiting block.

According to an embodiment of the present invention, the accommodating space includes an upper channel and a lower channel. The fixing mechanism has a first portion and a second portion, the first portion is located in the lower channel, and the second portion is located in the upper channel, in which the first portion is configured to position the light guide plate, and the groove is disposed on the second portion.

According to an embodiment of the present invention, the first portion of the fixing mechanism includes a first positioning portion and a second positioning portion. A surface of the first positioning portion abuts against a top surface of the light guide plate and a portion of the first positioning portion is engaged in a recess on an end surface of the light guide plate, and a fixing member is passed through the second positioning portion to abut against the top surface of the light guide plate.

According to an embodiment of the present invention, the frame body includes an upper cover fixed on the second portion of the fixing mechanism, and the upper cover has a notch correspondingly covering a portion of the groove of the fixing mechanism.

According to an embodiment of the present invention, the number of the at least one fixing mechanism is 2, and the number of the at least one light guide plate is 2, and the number of the at least one accommodating space is 2. the frame body includes a base. The base has a carrying portion and two sidewalls, the sidewalls stand on the carrying portion, and the accommodating spaces are defined by the carrying portion and the sidewalls, and a top portion is disposed on a top end of each of the sidewalls, and each of the top portions partitions each accommodating space into the upper channel and the lower channel. Each of the accommodating spaces accommodates one of the light guide plates and one of the light sources.

According to an embodiment of the present invention, the number of the at least one fixing mechanism is 2, and the number of the at least one light guide plate is 1, and the number of the at least one light source is 2. The frame body further includes two side covers, and the side covers and the fixing mechanisms are combined together to form the accommodating space. The light guide plate has two light-incident surfaces, and the light sources are respectively disposed in the side covers and are respectively disposed adjacent to the light-incident surfaces of the light guide plate.

According to the aforementioned object, a lamp system is provided. The lamp system includes at least two aforementioned lamps. The fixing mechanism of one of the lamps is coupled to the fixing mechanism of another one of the lamps adjacent to the one of the lamps, and the groove of the fixing mechanism of the one of the lamps communicates with the groove of the fixing mechanism of the another one of the lamps. The electrical connecting assembly of the one of the lamps is connected to the electrical connecting assembly of the another one of the lamps. The at least one end of the suspension member is slidable between the grooves of the adjacent fixing mechanisms.

According to an embodiment of the present invention, the light guide plates of the lamps are continuously connected to each other.

According to an embodiment of the present invention, the electrical connecting assembly of an endmost one of the lamps is connected to an external power source. The electrical connecting assembly of each of the rest of the lamps is connected to the electrical connecting assembly of its adjacent lamp so as to form a connection with the endmost one of the lamps.

According to the aforementioned object, a method for disassembling a lamp system is provided. The method includes the following steps. First, a lamp system is provided. The lamp system includes at least two lamps. Each of the lamps includes a frame body, at least one light guide plate, at least one light source, an electrical connecting assembly and at least one suspension member. The light guide plate is disposed in the frame body, and the at least one light source is disposed adjacent to a light-incident surface of the light guide plate, and the electrical connecting assembly is connected to the light source to form an electrical loop, and the suspension member is suspended in a groove of the frame body. Then, the suspension member is moved out of the groove of one of the lamps desired to be disassembled into the groove of another one of the lamps adjacent to the one of the lamps. Thereafter, the electrical connecting assembly of the one of the lamps is separated from the electrical connecting assembly of the another one of the lamps. Then, the one of the lamps is removed.

According to the aforementioned object, a method for assembling a lamp system is provided. The method includes the following steps. First, at least two lamps are provided. Each of the lamps includes a frame body, at least one light guide plate, at least one light source, an electrical connecting assembly and at least one suspension member. The light guide plate is disposed in the frame body, and the at least one light source is disposed adjacent to a light-incident surface of the light guide plate, and the electrical connecting assembly is connected to the light source to form an electrical loop, and the suspension member is suspended in a groove of the frame body. Then, the electrical connecting assembly of one of the lamps is connected to the electrical connecting assembly of another one of the lamps adjacent to the one of the lamps. Thereafter, the suspension member is moved from the groove of the one of the lamps to the groove of the another one of the lamps.

According to an embodiment of the present invention, at least one fixing mechanism is disposed on the frame body. The fixing mechanism has a side surface and a top surface, and the groove extends from the side surface to the top surface. The groove has a first end and a second end, and the first end is located on the side surface, and second end is located on the top surface. The frame body of each of the lamps further includes an upper cover corresponding to the fixing mechanism, and the upper cover has a notch covering a portion of the groove of the fixing mechanism. After moving the suspension member from the groove of the one of the lamps to the groove of the another one of the lamps, the method further includes covering the upper cover on the fixing mechanism so as to limit the suspension member in the notch of the upper cover of the another one of the lamps.

According to an embodiment of the present invention, the frame body of each of the lamps has an inner space, before connecting the one of the lamps to the another one of the lamps adjacent to the one of the lamps, the method further includes disposing a supporting bar between the inner spaces of the frame bodies of two adjacent lamps.

According to the aforementioned embodiments of the present disclosure, the present disclosure uses the frame body to integrate the electrical connecting assembly inside the lamp and the suspension member, thereby simplifying the structure of the lamp as well as providing an easy-to-assemble (or easy-to-disassemble) way for users when multiple lamps need to be connected together or disassembled from each other.

BRIEF DESCRIPTION OF THE DRAWINGS

The invention can be more fully understood by reading the following detailed description of the embodiment, with reference made to the accompanying drawings as follows:

FIG. 17C is a schematic diagram showing the lamp in a disassembled state in accordance with the second embodiment of the present disclosure.

DETAILED DESCRIPTION

Spatially relative terms used in the present disclosure, such as "upper," "beneath," "lower," "X-direction," "Y-direction," and the like, may be used herein for ease of description to describe one element or feature's relationship to another element(s) or feature(s) as illustrated in the figures.

Figure 1:
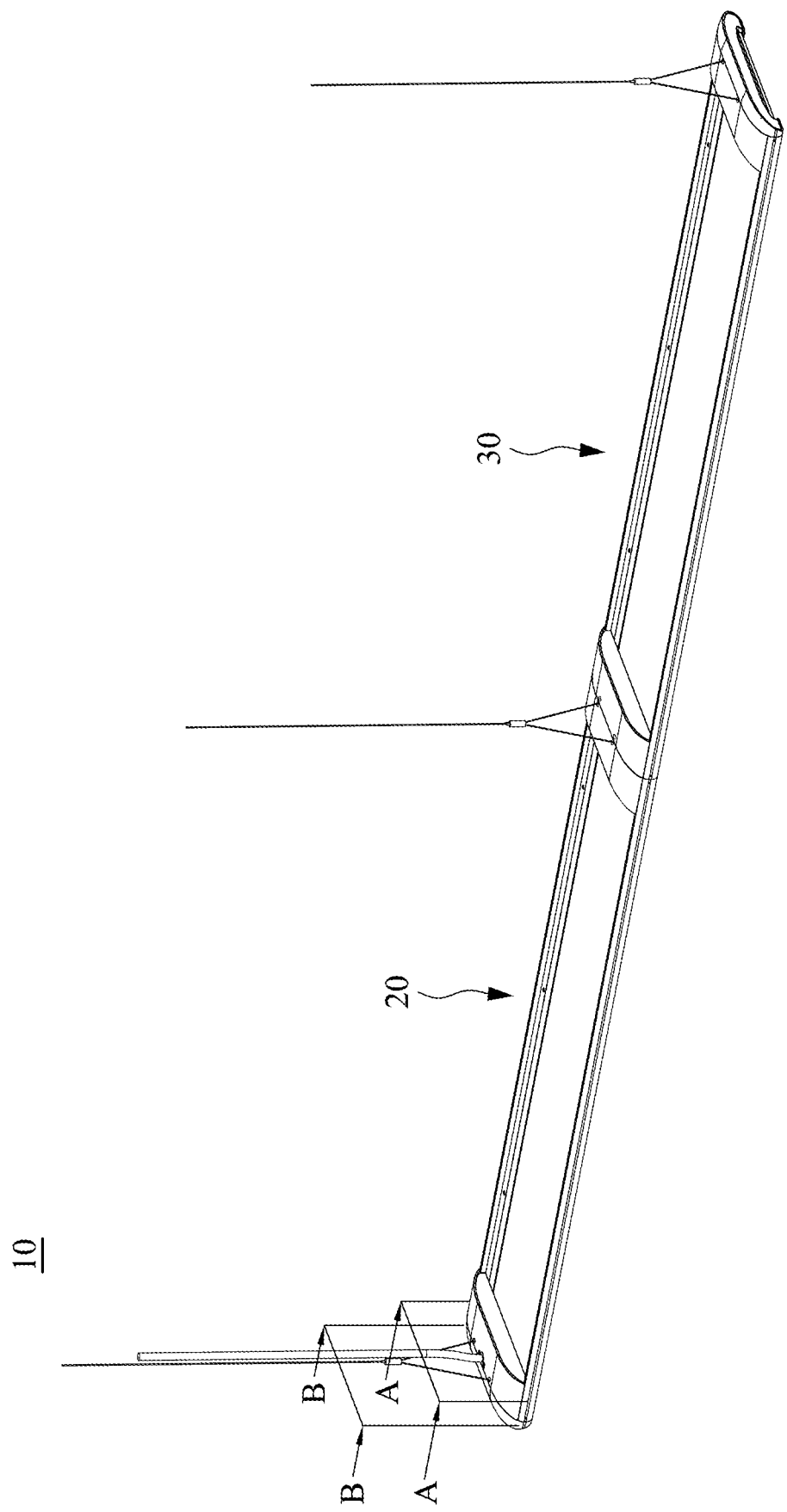
FIG. 1 is a schematic structural diagram showing a lamp system in accordance with a first embodiment of the present invention.
Figure 2:
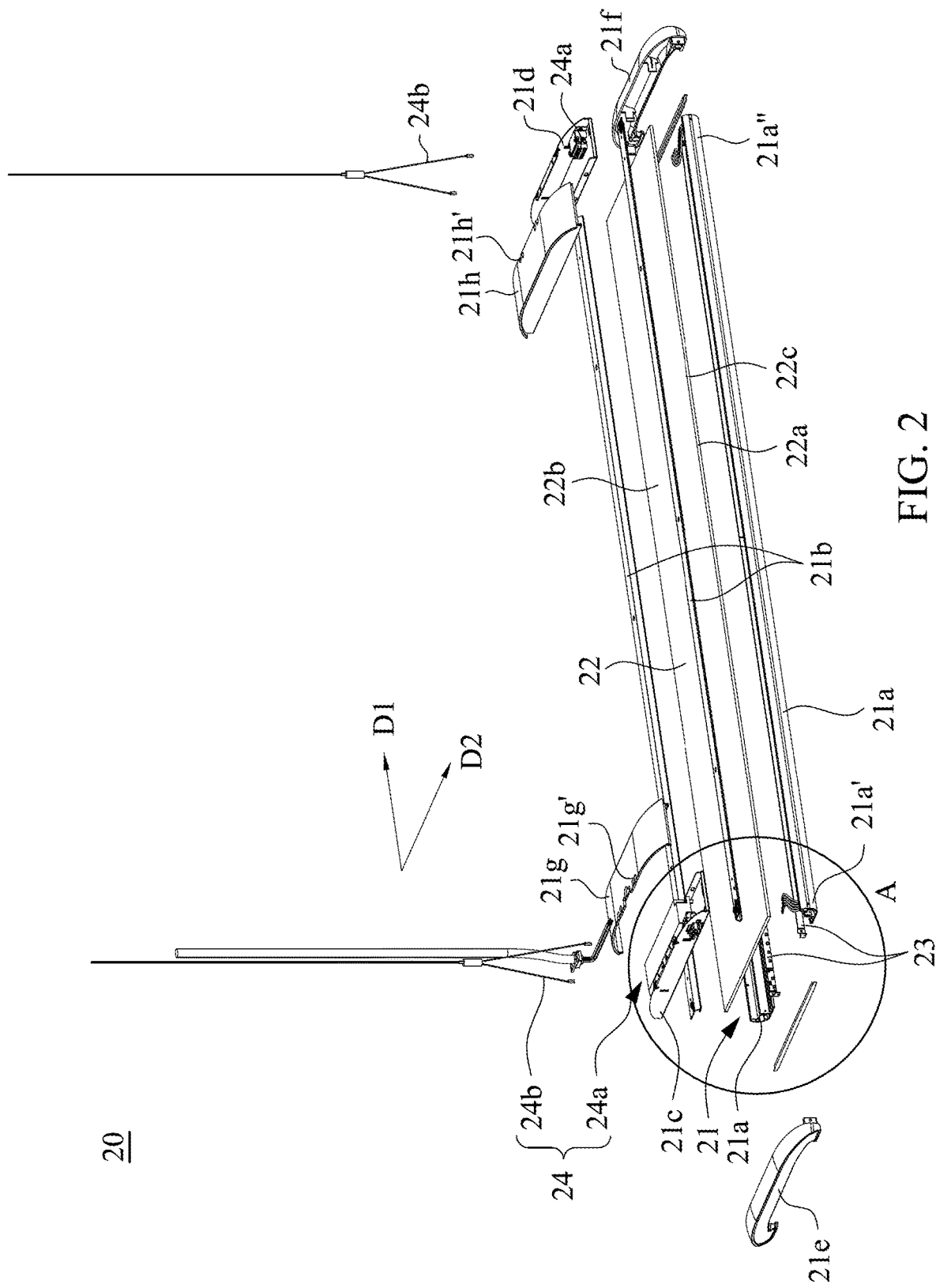
FIG. 2 is a schematic exploded view showing a lamp in accordance with the first embodiment of the present invention.

Referring to FIG. 1 and FIG. 2, FIG. 1 is a schematic structural diagram showing a lamp system 10 in accordance with a first embodiment of the present invention, and FIG. 2 is a schematic exploded view showing a lamp 20 in accordance with the first embodiment of the present invention. The lamp system 10 in the present embodiment is mainly constituted by at least two lamps (such as the lamp 20 and a lamp 30) connected in series. The lamp 20 mainly includes a frame body 21, a light guide plate 22, at least one light source 23 and a connecting mechanism 24. The frame body 21 includes two side covers 21a, two side bars 21b, a first end cover 21c, a second end cover 21d, a first decorative cover 21e, a second decorative cover 21f, a first upper cover 21g and a second upper cover 21h.

Figure 3:
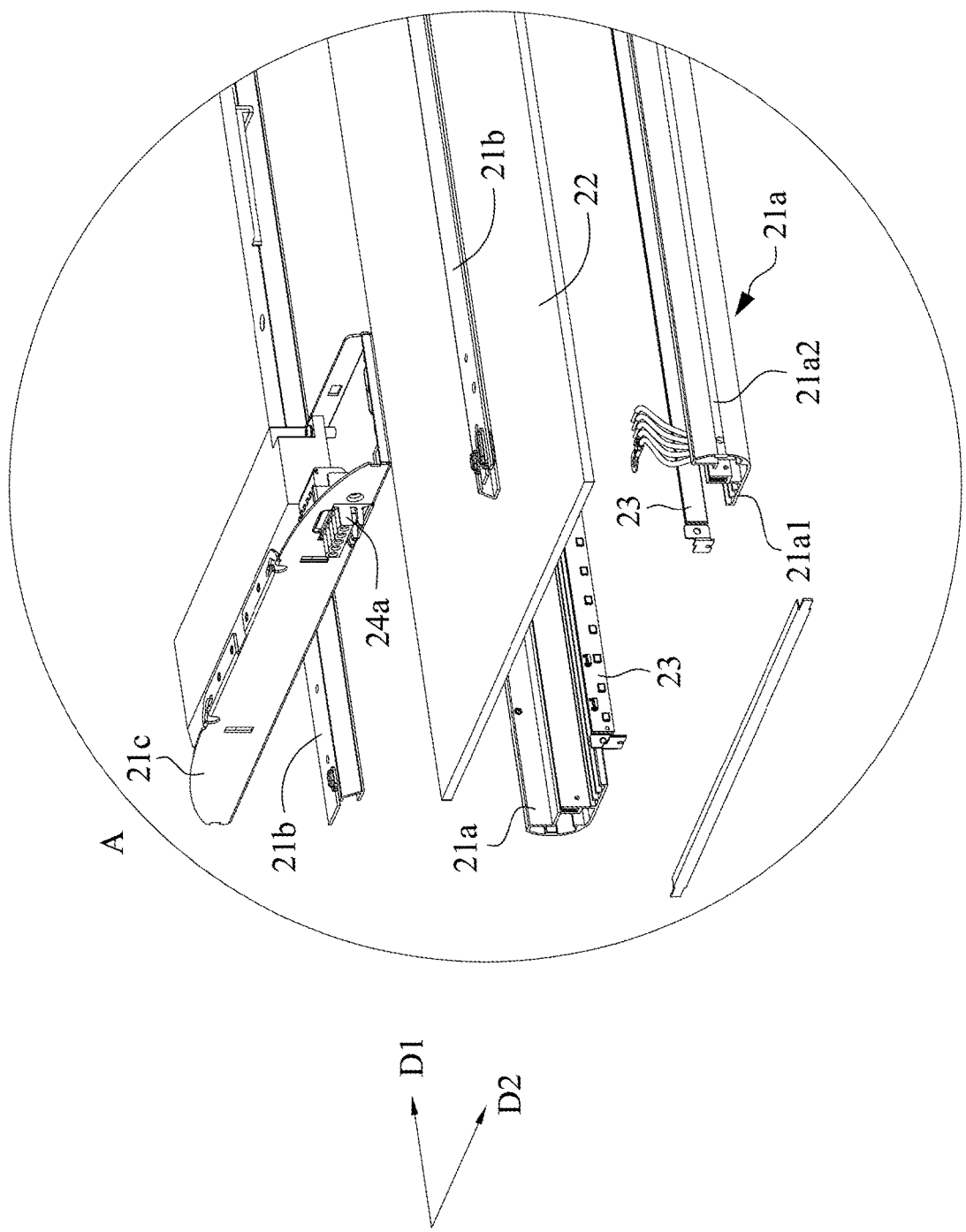
FIG. 3 is an enlarged view of zone "A" in FIG. 2.

Simultaneously referring to FIG. 2 and FIG. 3, FIG. 3 is an enlarged view of zone "A" in FIG. 2. In one embodiment, the side covers 21a extend along a first direction D1 (e.g. X-direction), and each of the side covers 21a has a first end 21a' and a second end 21a" opposite to each other. In addition, the first end cover 21c and the second end cover 21d extend along a second direction D2 (e.g. Y-direction). The first end cover 21c is disposed on the first ends 21a' of the side covers 21a, and the second end cover 21d is disposed on the second ends 21a" of the side covers 21a. Therefore, an accommodating space is defined among the two side covers 21a which extend along the X-direction as well as the first end cover 21c and the second end cover 21d which extend along the Y-direction. The light guide plate 22 is disposed in the accommodating space. In other words, in the present embodiment, the two side covers 21a, the first end cover 21c and the second end cover 21d can be combined to form a frame body, and the frame body has at least one accommodating space. It is noted that, the frame body of the present embodiment does not necessarily require all of the components of two side covers 21a, the first end cover 21c and the second end cover 21d to form an enclosed accommodating space. In other embodiment, it is also possible to use only three or less components to form an open accommodating space. Accordingly, the frame body does not necessarily include two side covers 21a, the first end cover 21c and the second end cover 21d. In the present embodiment, each of the side covers 21a includes a carrying portion 21a1 and a sidewall 21a2, and the sidewall 21a2 is connected to a side edge of the carrying portion 21a1. The light source 23 is disposed on the carrying portion 21a1 and is adjacent to a light-incident surface 22a of the light guide plate 22. In one embodiment, the light source 23 is a LED light bar.

Figure 4:
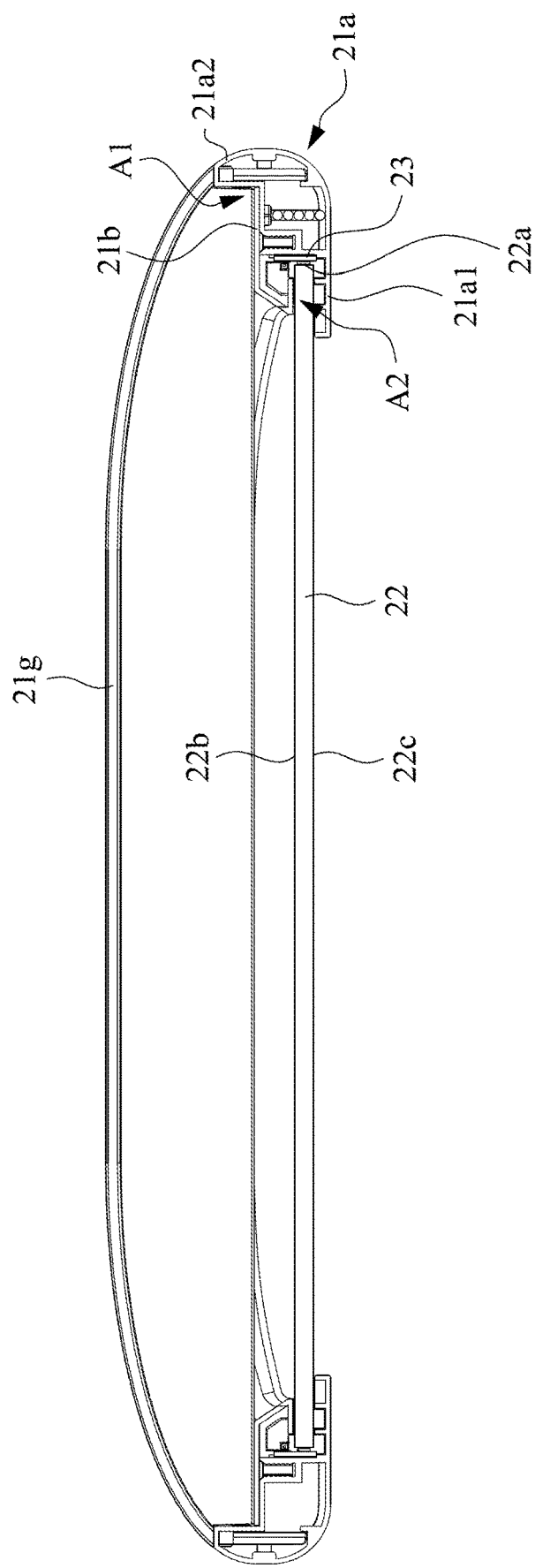
FIG. 4 is a schematic cross-sectional view taken along line A-A in FIG. 1.

Simultaneously referring to FIG. 4, FIG. 4 is a schematic cross-sectional view taken along line A-A in FIG. The side bars 21b extend along the first direction D1 and are respectively and correspondingly disposed on the side covers 21a. Each of the side bars 21b separates its corresponding side cover 21a into an upper channel A1 and a lower channel A2. The upper channel A1 is a space surrounded by a top surface of the side bar 21b and the sidewall 21a2 of the side cover 21a. The lower channel A2 is a space surrounded by a bottom portion of the side bar 21b and the carrying portion 21a1 of the side cover 21a. The light guide plate 22 is disposed in the lower channels A2 and is located between the bottom portion of the side bar 21b and the carrying portion 21a1. The light guide plate 22 has a first light-emitting surface 22b and a second light-emitting surface 22c, in which the first light-emitting surface 22b and the second light-emitting surface 22c are respectively connected to two opposing sides of the light-incident surface 22a. In addition, the first end cover 21c and the second end cover 21d are located in the upper channels A1. The connecting mechanism 24 includes an electrical connecting assembly 24a and a suspension member 24b, and the electrical connecting assembly 24a is disposed in the first end cover 21c and the second end cover 21d. With such design, since the light guide plate 22 is located in the lower channels A2, the electrical connecting assembly 24a disposed in the upper channel A1 will not block light from emitting downwards from the light guide plate 22. In the present embodiment, a portion of the light guide plate 22 near the light-incident surface 22a is disposed between the bottom portion of each the side bar 21b and the carrying portion 21a1 of each side cover 21a and is located adjacent to the light source 23 on the carrying portions 21a1. In other words, only portions of the first light-emitting surface 22b and the second light-emitting surface 22c of the light guide plate 22 near side edges are located between the side bar 21b and the side cover 21a (i.e. only the portions near the side edges are covered by the frame body 21), thereby hiding hotspot phenomenon occurring on the portions of the first light-emitting surface 22b and the second light-emitting surface 22c of the light guide plate 22 near the light source 23.

Figure 5:
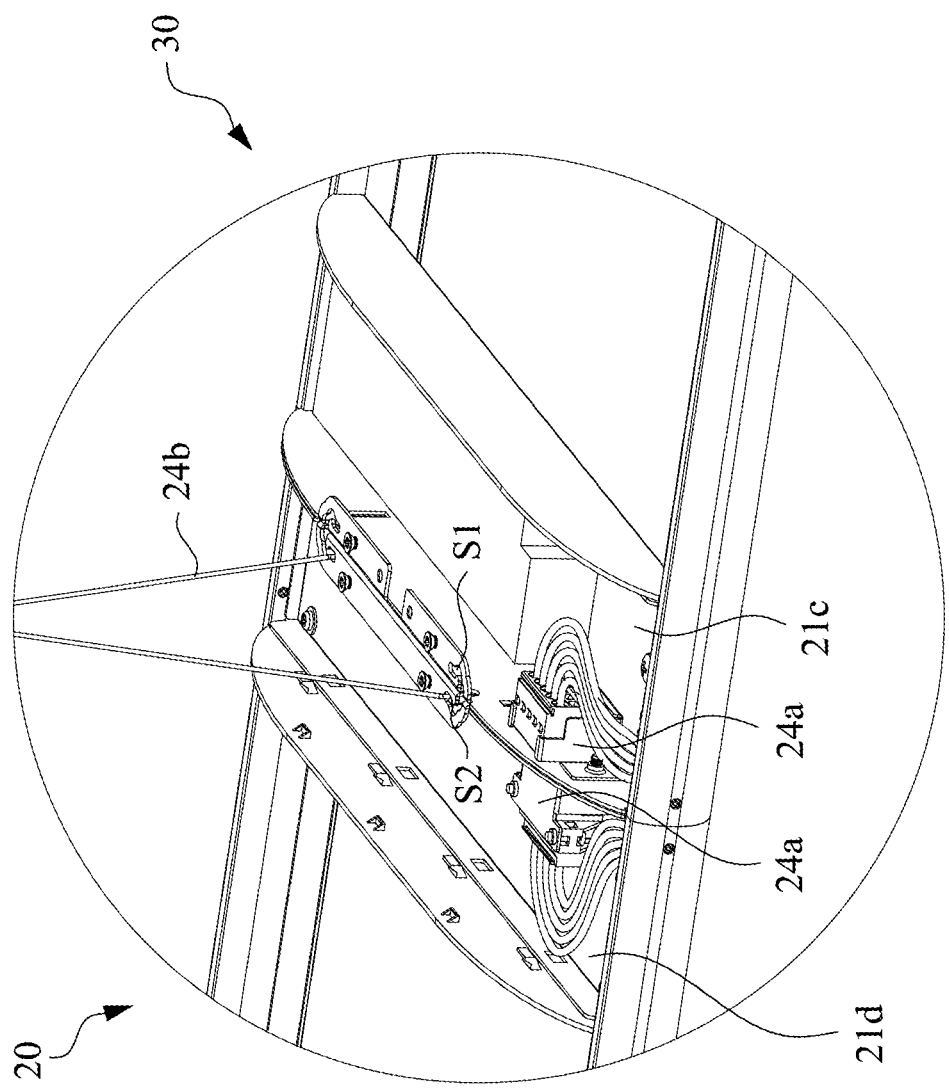
FIG. 5 is a partial structural diagram showing the lamps jointed together in accordance with the first embodiment of the present disclosure.

Referring to FIG. 2 and FIG. 3 again, the electrical connecting assembly 24a is disposed on the first end cover 21c and the second end cover 21d and is connected to the light source 23 so as to form an electrical loop. Therefore, the electrical connecting assembly 24a of the lamp 20 not only can provide power required by the light source 23 itself, but also can be electrically connected to another electrical connecting assembly 24a of another lamp. In one embodiment, the electrical connecting assembly 24a is an electrically connected system formed by a quick connector and an internal wire of the lamp. Also referring to FIG. 5, FIG. 5 is a partial structural diagram showing the lamps jointed together in accordance with an embodiment of the present disclosure. It is noted that, the lamp 20 and the lamp 30 have substantially same structure. In the present embodiment, the lamp 20 is the first lamp (i.e. the endmost lamp). When the lamp 20 and the lamp 30 are connected together, the electrical connecting assembly 24a of the lamp 20 is connected to the electrical connecting assembly 24a of the lamp 30, and the electrical connecting assembly 24a of the lamp 20 is connected to an external power source. Therefore, the power provided by the external power source which is transmitted to the electrical connecting assembly 24a of the lamp 20 is further transmitted to the lamp 30. In other embodiments, if there is another lamp to be connected to the lamp 30, the power transmitted to the lamp 30 is further transmitted to the another lamp by the electrical connecting assembly 24a. Therefore, only one external power source is used to provide power for multiple lamps instead of setting up multiple external power sources on each lamp, thereby forming a lamp with simple wiring structure as well as easy-to-assemble and time-saving advantages.

Figure 6:
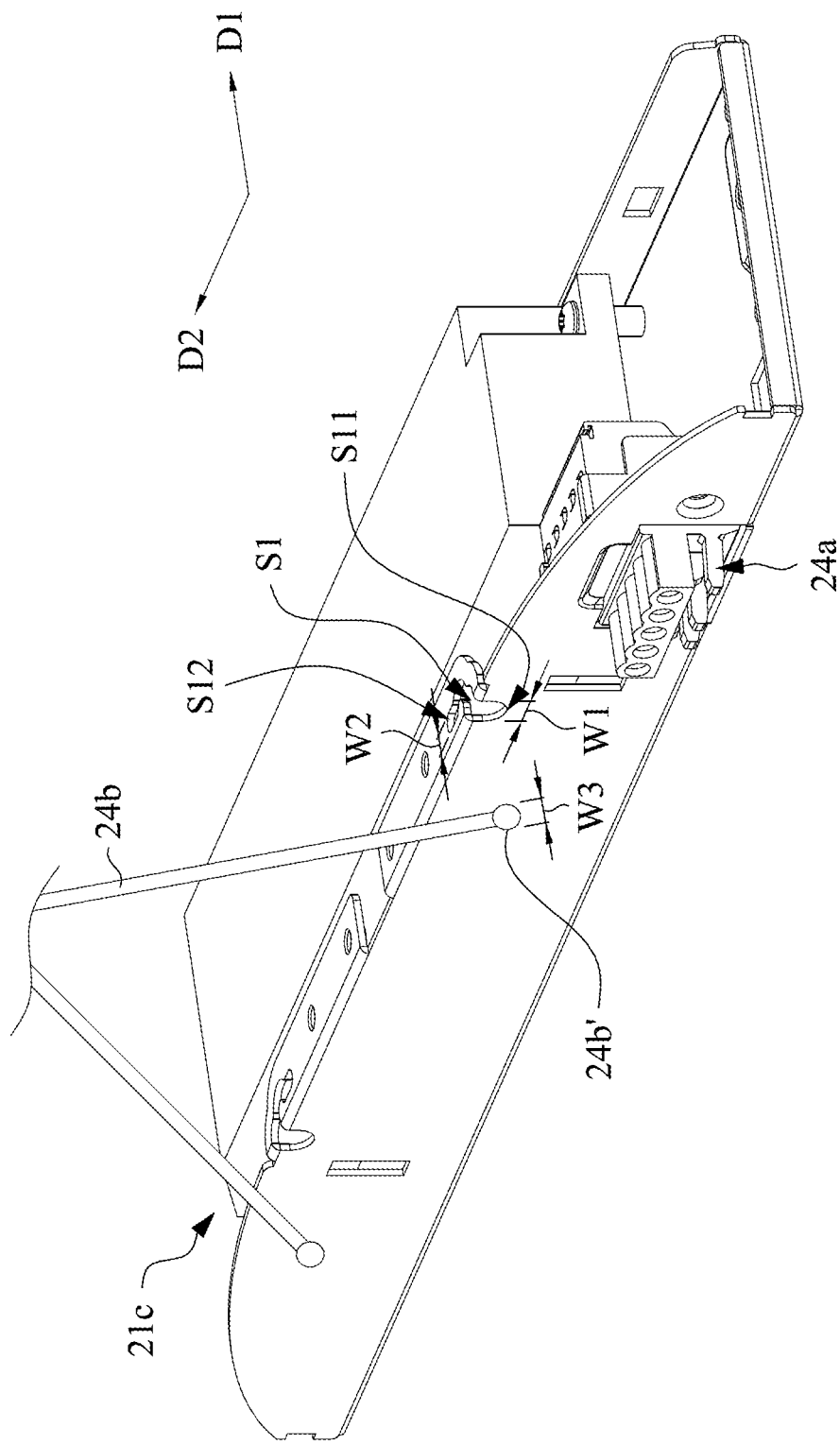
FIG. 6 is a schematic structural diagram showing a first end cover and a suspension member in accordance with the first embodiment of the present disclosure.

Simultaneously referring to FIG. 5 and FIG. 6, FIG. 6 is a schematic structural diagram showing first end cover 21c and the suspension member 24b in accordance with the first embodiment of the present disclosure. In the present embodiment, at least one fixing mechanism is disposed on the frame body. The frame body includes two side covers 21a, and an open accommodating space is defined by the two side covers 21a. The fixing mechanism includes the first end cover 21c and the second end cover 21d. The first end cover 21c is disposed at the first ends 21a' of the side covers 21a, and the second end cover 21d is disposed at the second ends 21a" of the side cover 21a. The first end cover 21c has a groove S1 extending from a side surface of the first end cover 21c to a top surface of the first end cover 21c, and the groove S1 is passed through the top surface and the side surface of the first end cover 21c. The groove S1 is L-shaped and has a first end S11 and a second end S12, in which the first end S11 is located on the side surface of the first end cover 21c, and the second end S12 is located on the top surface of the first end cover 21c. In addition, a limiting block 24b' is disposed on one end of the suspension member 24b, in which a width W1 of the first end S11 of the groove S1 is greater than a width W3 of the limiting block 24b', and a width W2 of the second end S12 of the groove S1 is smaller than the width W3 of the limiting block 24b'. Therefore, the at least one end of the suspension member 24b can be inserted into the groove S1 from the side surface of the first end cover 21c and further be moved along the groove S1. Meanwhile, the suspension member 24b can be pulled down by the lamp due to the gravity of the lamp, and further, because the width W3 of the limiting block 24b' of the suspension member 24b is greater than the width W2 of the second end S12 of the groove S1, the limiting block 24b' of the suspension member 24b cannot escape upward and thus is limited on the top surface of the first end cover 21c. In the embodiment of FIG. 6, after one end of the suspension member 24b is passed through the first end S11 of the groove S1 and moved along the first direction D1, the end of the suspension member 24b is moved along the second direction D2 to the second end S12 of the groove S1. It is noted that, as shown in FIG. 5, the second end cover 21d and the first end cover 21c have substantially same structure, and the second end cover 21d has a groove S2 which will not be described herein.

Referring to FIG. 5 and FIG. 6 again, when the lamp 20 and the lamp 30 are connected in series, the second end cover 21d of the lamp 30 is coupled to the first end cover 21c of the lamp 20, and the groove S2 on the second end cover 21d of the lamp 20 communicates with the groove S1 on the first end cover 21c of the lamp 30. Therefore, the suspension member 24b can be slid from the groove S2 of the lamp 20 to the groove S1 of the lamp 30. More specifically, the suspension member 24b can be slid from the top surface of the second end cover 21d of the lamp 20 to the side surface of the second end cover 21d so as to be departed from the second end cover 21d, and then be slid to the groove S1 on the side surface of the first end cover 21c of the lamp 30 and be further moved to and limited on the top surface of the first end cover 21c of the lamp 30. Therefore, by the design of the suspension member 24b which can be moved between two adjacent lamps, the assembling process between the suspension member and the lamp can be simplified while the lamps are connected in series or disassembled from each other.

Figure 7:
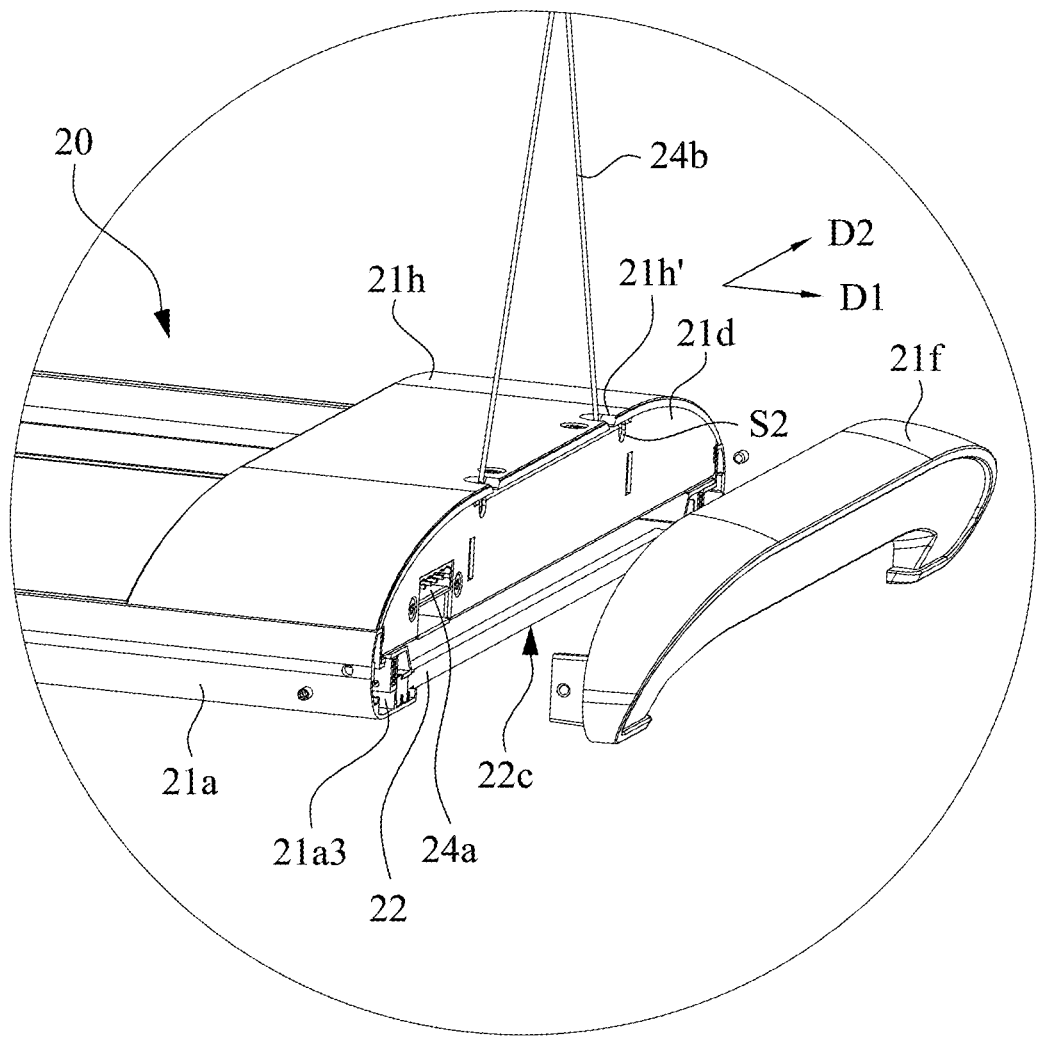
FIG. 7 is a partial enlarged view showing the lamp in accordance with the first embodiment of the present disclosure.

Referring to FIG. 2, FIG. 5, FIG. 7, and FIG. 8, FIG. 7, and FIG. 8 are partial enlarged views respectively showing the lamps 20 and 30 in accordance with the first embodiment of the present disclosure. In the present embodiment, the first upper cover 21g is used to cover the first end cover 21c, and the second upper cover 21h is used to cover the second end cover 21d. The first upper cover 21g has a notch 21g', and the second upper cover 21h has a notch 21h'. As shown in FIG. 7, when the second upper cover 21h is disposed on the second end cover 21d, the second upper cover 21h covers a portion of the groove S2 of the second end cover 21d, so as to limit the suspension member 24b in the notch 21h'. Similarly, as show in FIG. 8, when the first upper cover 21g is disposed on the first end cover 21c, the first upper cover 21g covers a portion of the groove S1 of the first end cover 21c, so as to limit the suspension member 24b in the notch 21g'. Therefore, the first upper cover 21g and the second upper cover 21h can prevent the electrical connecting assembly 24a (FIG. 6) from the dust accumulated thereon which results in poor heat dissipation. At the same time, the first upper cover 21g and the second upper cover 21h can make the overall appearance of the lamp more streamlined and concise.

Figure 8:
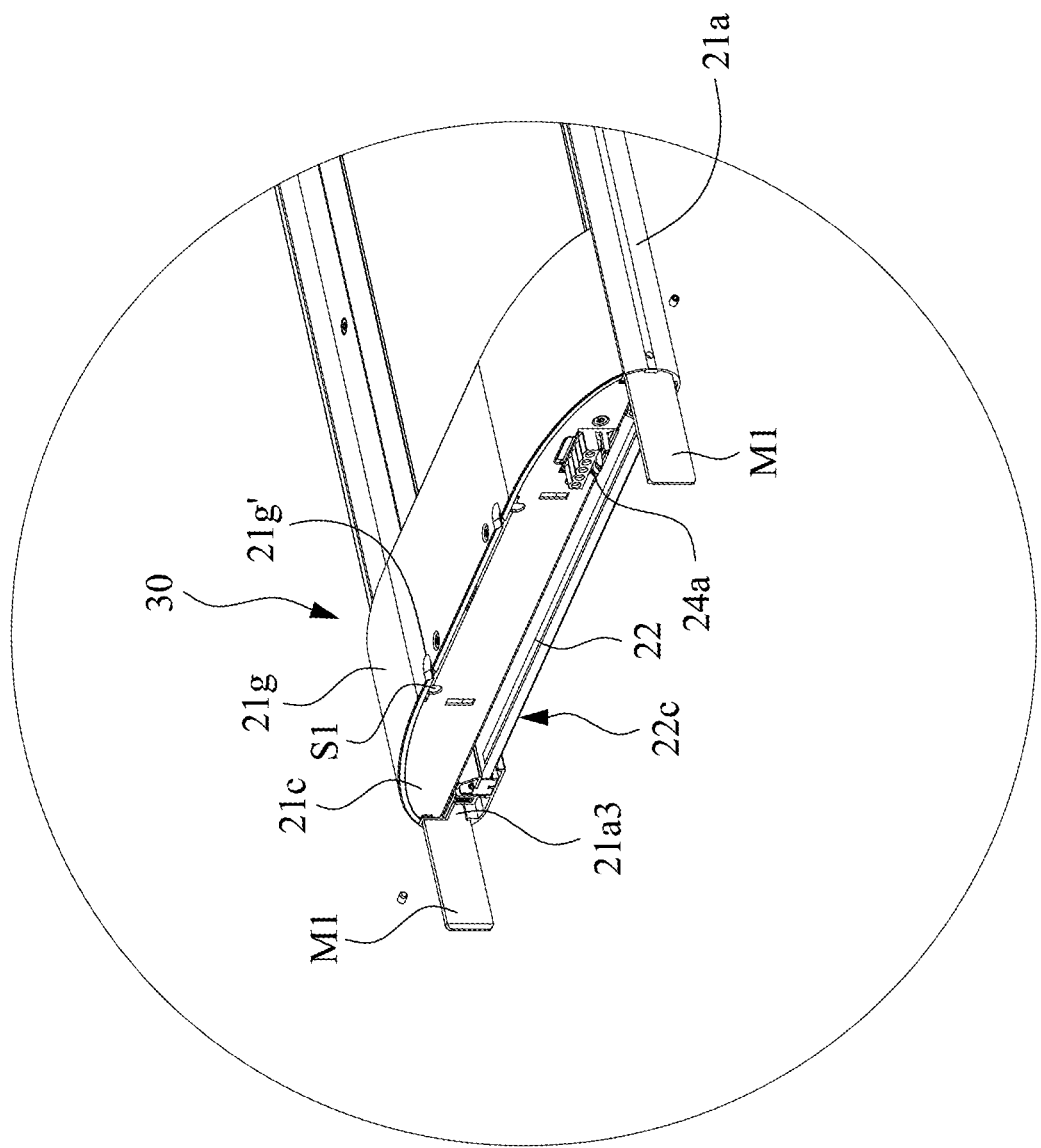
FIG. 8 is another partial enlarged view showing the lamp in accordance with the first embodiment of the present disclosure.

Referring to FIG. 2, FIG. 5, FIG. 7 and FIG. 8 again, the present disclosure further provides a method for assembling a lamp system. The method mainly includes the following steps. At first, at least two aforementioned lamps, such as the lamp 20 and the lamp 30, are provided. Thereafter, the second decorative cover 21f and the second upper cover 21h of the lamp 20 are removed, and the first decorative cover 21e and the first upper cover 21g of the lamp 30 are removed. Then, as shown in FIG. 5, the electrical connecting assembly 24a of the lamp 30 is coupled to the electrical connecting assembly 24a of the lamp 20 which is adjacent to the lamp 30, so that the second end cover 21d of the lamp 20 is connected to the first end cover 21c of the lamp 30, and the groove S2 on the second end cover 21d of the lamp 20 communicates with the groove S1 on the first end cover 21c of the lamp 30. Thereafter, the suspension member 24b is slid from the groove S2 of the lamp 20 to the groove S1 of the lamp 30. Then, the second upper cover 21h of the lamp 20 is covered on the second end cover 21d, and the first upper cover 21g of the lamp 30 is covered on the first end cover 21c, so that the suspension member 24b is limited in the notch 21g' of the first upper cover 21g of the lamp 30, thereby forming the lamp system 10 as shown in FIG. 1. In addition, before coupling the lamp 30 to the lamp 20, as shown in FIG. 8, at least two supporting bars M1 are correspondingly inserted into the inner spaces 21a3 which are formed between the carrying portion 21a1 and the sidewall 21a2. Therefore, when the second end cover 21d of the lamp 20 is coupled to the first end cover 21c of the lamp 30, one portion of each of the supporting bars M1 is inserted in the inner space 21a3 of the side cover 21a of the lamp 30, and the other portion of each of the supporting bars M1 is inserted in the inner space 21a3 of the side cover 21a of the lamp 20, thereby increasing an engagement stability between the lamp 20 and the lamp 30.

Simultaneously referring to FIG. 4, the first end cover 21c and the second end cover 21d are disposed on an upper portion of the side cover 21a, and the light guide plate 22 is disposed on a lower portion of the side cover 21a. When the first decorative cover 21e and the second decorative cover 21f are removed, two opposing side surfaces of the light guide plate 22 which extend along the second direction D2 are respectively aligned with a side surface of the first end cover 21c and a side surface of the second end cover 21d. Therefore, when the lamp 20 and the lamp 30 are connected together, the light guide plate 22 of the lamp 20 and the light guide plate 22 of the lamp 30 are continuously connected to each other. In other words, the second light-emitting surface 22c of the light guide plate 22 of the lamp 20 and the second light-emitting surface 22c of the light guide plate 22 of the lamp 30 are connected to form a continuous light-emitting surface, thereby improving the appearance of the lamp system and reducing dark areas.

Figure 9A:
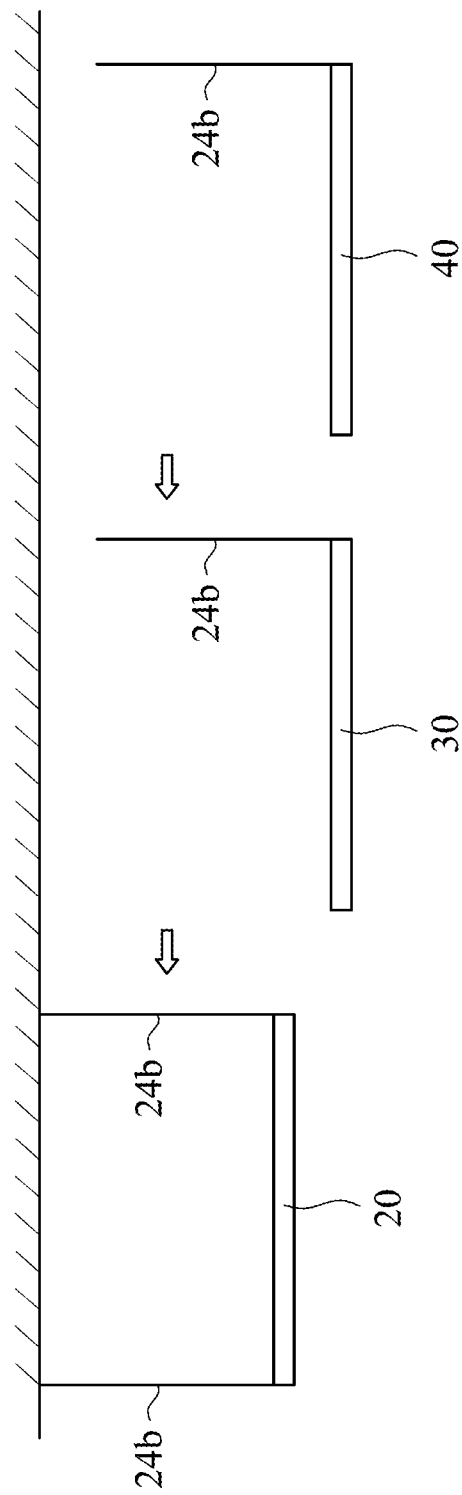
FIG. 9A is a schematic diagram showing an assembling process of a lamp system in accordance with the first embodiment of the present disclosure.

Referring to FIG. 9A, FIG. 9A is a schematic diagram showing an assembling process of a lamp system in accordance with the first embodiment of the present disclosure. When there is only one lamp 20 (i.e. the first lamp), two suspension members 24b are respectively disposed on two opposing sides of the lamp 20 so as to be fixed on the ceiling. When a second lamp (such as the lamp 30) needs to be additionally mounted, the aforementioned method for assembling the lamp system can be used to connect the lamp 30 to the lamp 20, and only one suspension member 24b is needed to be disposed on one side of the lamp 30 away from the lamp 20, in which the other side of the lamp 30 adjacent to the lamp 20 is connected to the lamp 20 by using the supporting bars M1 as shown in FIG. 8. More specifically, one portion of each of the supporting bars M1 is inserted in the inner space 21a3 of the side cover 21a of the lamp 20, and the other portion of each of the supporting bars M1 is inserted in the inner space 21a3 of the side cover 21a of the lamp 30, thereby increasing an engagement stability between the lamp 20 and the lamp 30. Similarly, when a third lamp (such as the lamp 40) needs to be additionally disposed, the aforementioned method for assembling the lamp system also can be used to connect the lamp 40 to the lamp 30, and only one the suspension member 24b is need to be disposed on one side of the lamp 40 away from the lamp 30, in which the other side of the lamp 40 adjacent to the lamp 30 is connected to the lamp 30 by the supporting bars M1 which protrudes from the side cover of the lamp 40 and is inserted into the side cover of the lamp 30, thereby increasing an engagement stability between the lamp 30 and the lamp 40.

Figure 9B:
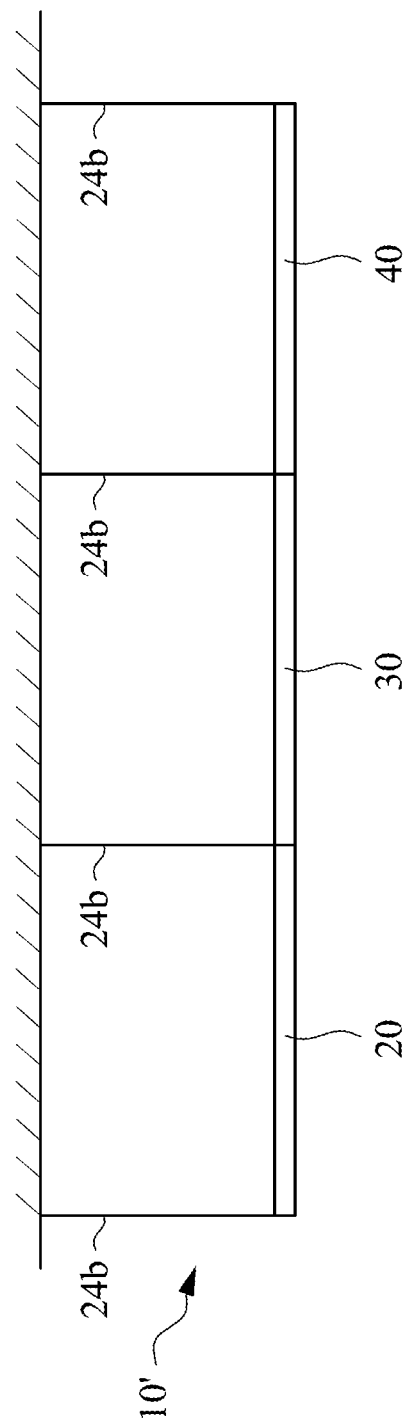
FIG. 9B is a schematic diagram showing the lamp system in an assembled state in accordance with the first embodiment of the present disclosure.
Figure 9C:
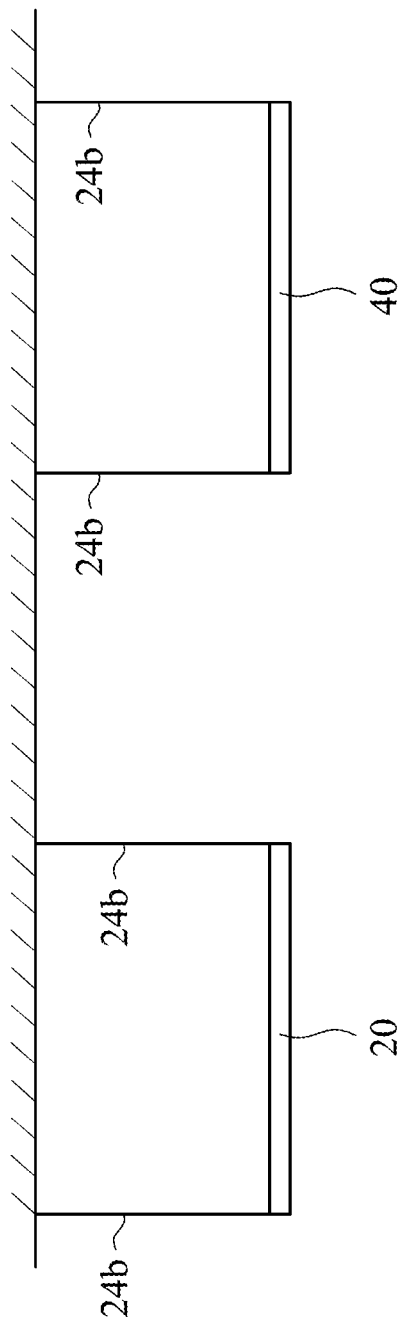
FIG. 9C is a schematic diagram showing the lamp in a disassembled state in accordance with the first embodiment of the present disclosure.

Referring to FIG. 9B and FIG. 9C, FIG. 9B is a schematic diagram showing a lamp system in an assembled state in accordance with the first embodiment of the present disclosure, and FIG. 9C is a schematic diagram showing a lamp in a disassembled state in accordance with the first embodiment of the present disclosure. The present disclosure further provides a method for disassembling a lamp system. The method mainly includes the following steps. At first, a lamp system 10' shown in FIG. 9B is provided. Then, before the lamp 30 is disassembled, the suspension member 24b of the lamp 30 is slid from the groove of the lamp 30 to the groove of the lamp 40. Thereafter, the electrical connecting assemblies which located on two opposite sides of the lamp 30 are respectively separated from the electrical connecting assembly of the lamp 20 and the electrical connecting assembly of the lamp 40, thereby separating two opposing end caps of the lamp 30 from the lamp 20 and the lamp 40 respectively. Then, the lamp 30 is removed so as to form two separated lamps (i.e. the lamp 20 and the lamp 40) as shown in FIG. 9C. By the lamp design of the present disclosure, the user can remove one of the lamps from the lamp system without additionally setting or removing another suspension member, thereby simplifying the overall lamp structure as well as simplifying the assembling and disassembling method.

Figure 10:
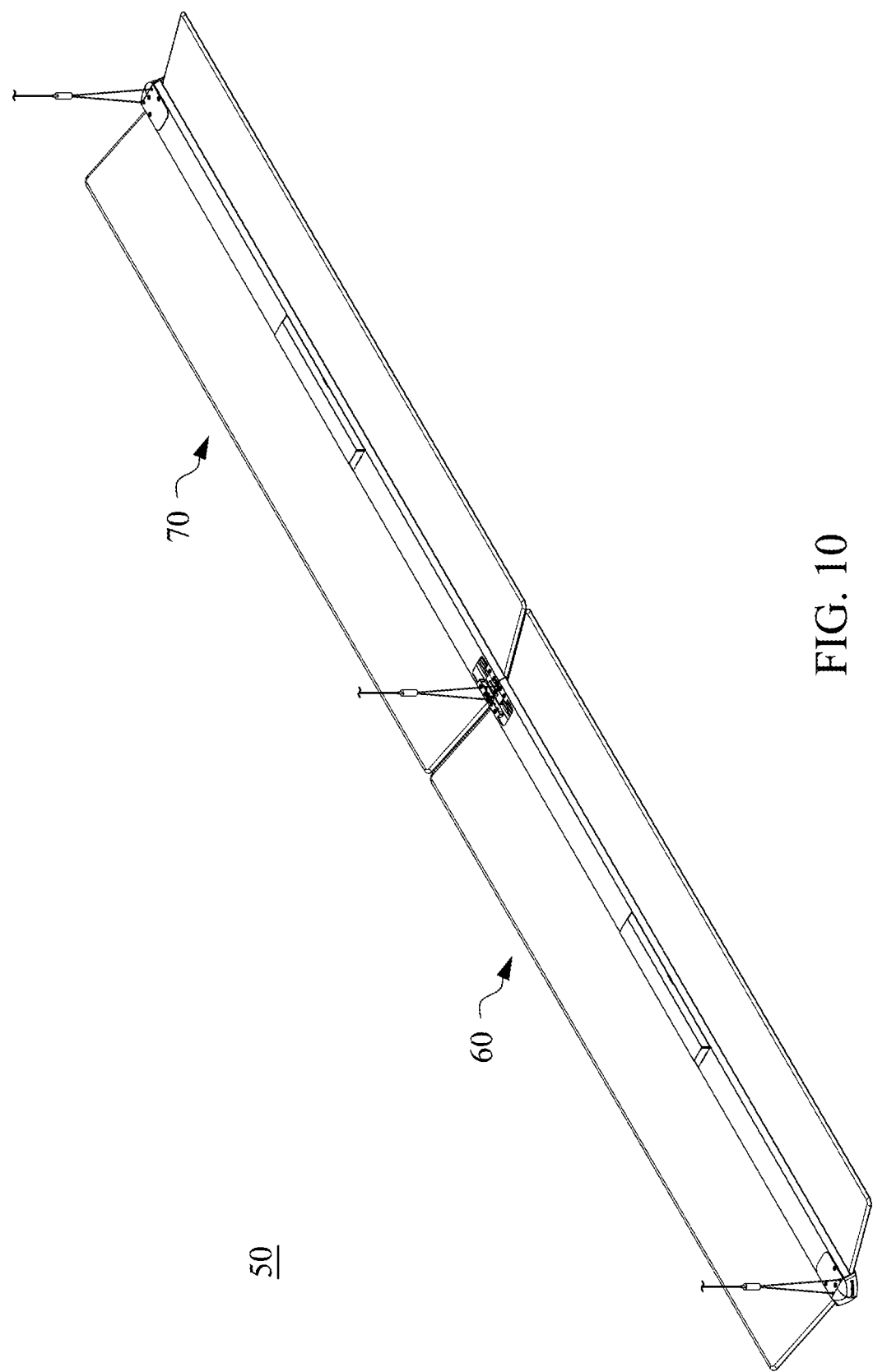
FIG. 10 is a schematic diagram showing a lamp system in accordance with a second embodiment of the present invention.
Figure 11:
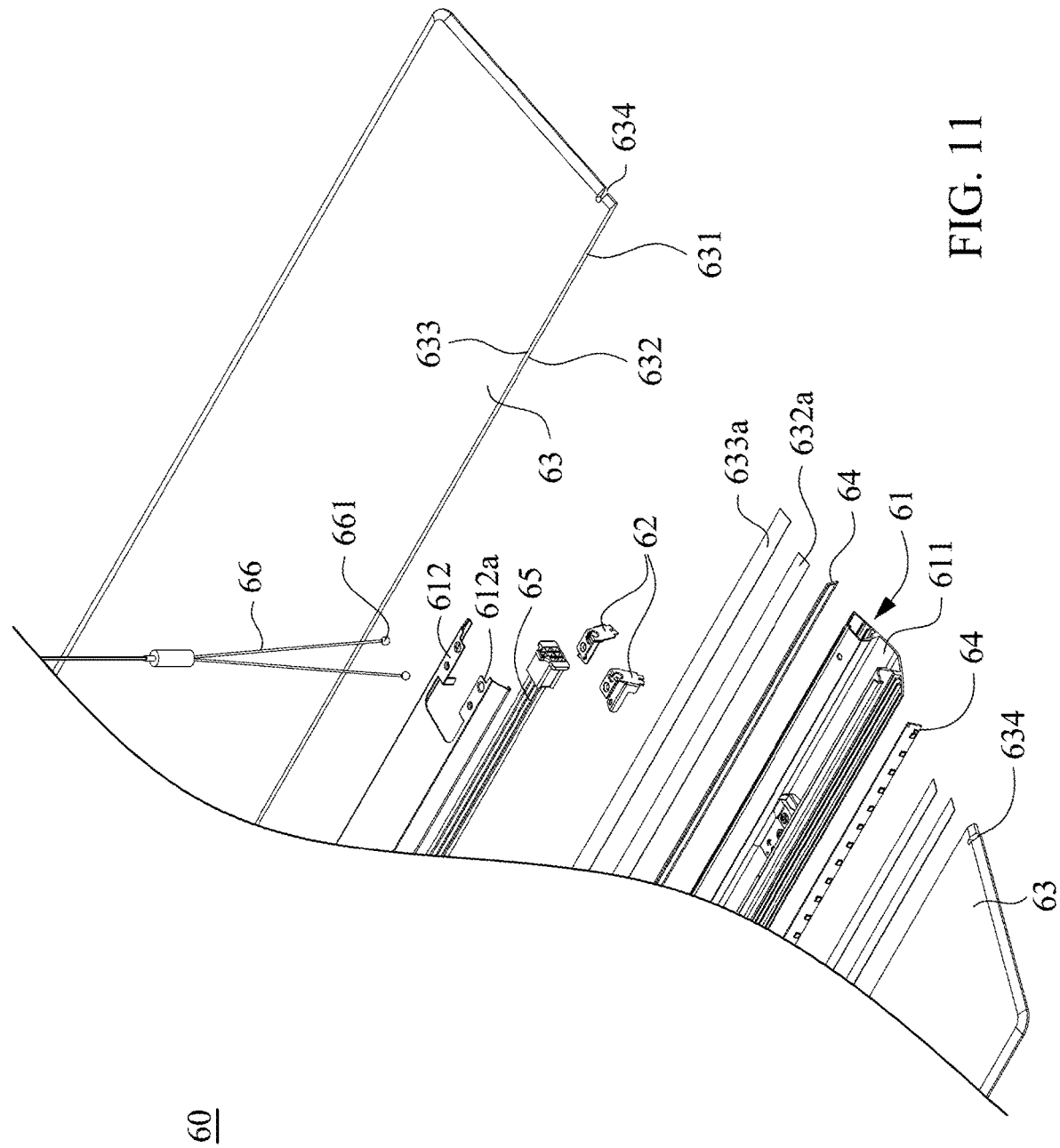
FIG. 11 is a partial exploded view showing a lamp in accordance with the second embodiment of the present invention.

Referring to FIG. 10 and FIG. 11, FIG. 10 is a schematic structural diagram showing a lamp system 50 in accordance with a second embodiment of the present invention, and FIG. 2 is a schematic exploded view showing a lamp 60 in accordance with the second embodiment of the present invention. The lamp system 50 in the present embodiment is mainly constituted by at least two lamps (such as the lamp 60 and a lamp 70) connected in series. The lamp 60 mainly includes a frame body 61, at least one fixing mechanism 62, at least one light guide plate 63, at least one light source 64, an electrical connecting assembly 65 and at least one suspension member 66. The light guide plate 63 is disposed in the frame body 61, the light source 64 is disposed adjacent to a light-incident surface 631 of the light guide plate 63. The electrical connecting assembly 65 is connected to the light source 64 so as to form an electrical loop. The suspension member 66 is suspended on the groove S3 of the frame body 61.

Figure 12:
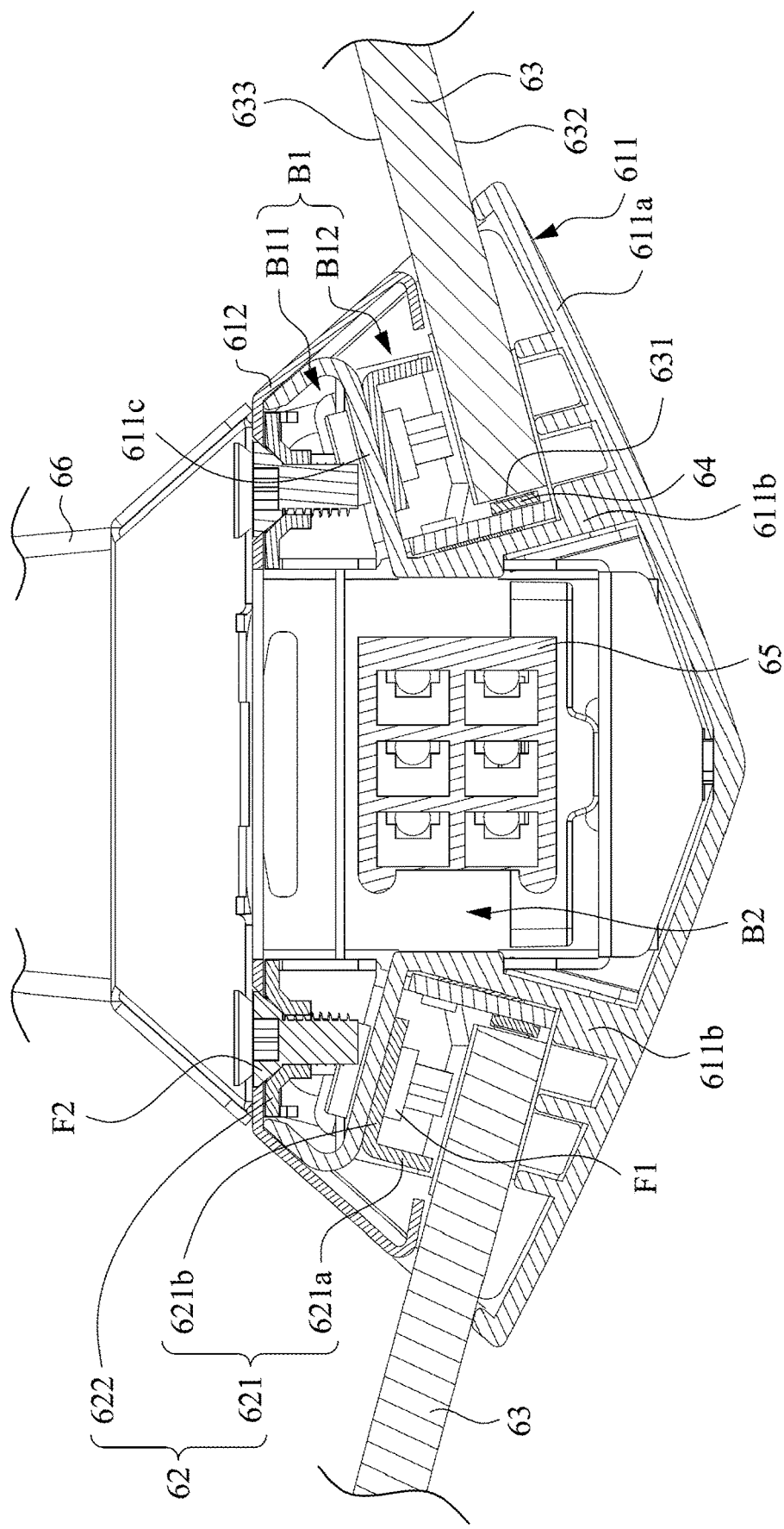
FIG. 12 is a partial cross-sectional view showing the lamp in accordance with the second embodiment of the present invention.

Simultaneously referring to FIG. 11 and FIG. 12, FIG. 12 is a partial cross-sectional view showing the lamp 60 in accordance with the second embodiment of the present invention. In the present embodiment, the frame body 61 includes a base 611 and an upper cover 612. The frame body 61 has an accommodating space B1. The light source 64 and the light guide plate 63 are disposed in the accommodating space B1, and the light source 64 is disposed adjacent to the light-incident surface 631 of the light guide plate 63. In one embodiment, the light source 64 is a LED light bar.

As shown in FIG. 11 and FIG. 12, the base 611 has a carrying portion 611a and two sidewalls 611b. The sidewalls 611b stand on the carrying portion 611a, and two accommodating spaces B1 are respectively defined by the carrying portion 611a and each of two outer sides of the sidewalls 611b, and two inner sides of the sidewalls 611b can define an inner space B2 together with the carrying portion 611a. As shown in FIG. 12, a top portion 611c is disposed on a top end of each of the sidewalls 611b, and each of the top portions 611c separates the accommodating space B1 into an upper channel B11 and a lower channel B12. The upper channel B11 is a space above the top portion 611c. The lower channel B12 is a space which is under the top portion 611c and is surrounded by an outer surface of the sidewall 611b, the carrying portion 611a and the top portion 611c. There are two light sources 64 and two light guide plates 63 disposed in the lower channel B12. The light guide plate 63 has a first light-emitting surface 632 and a second light-emitting surface 633, and the first light-emitting surface 632 and the second light-emitting surface 633 are respectively connected to two opposing sides of the light-incident surface 631. In the present embodiment, only portions of the first light-emitting surface 632 and the second light-emitting surface 633 of the light guide plate 63 near side edges are located between the carrying portion 611a and the top portion 611c (i.e. only the portions near the side edges are covered by the frame body 61), thereby hiding hotspot phenomenon occurring on the portions of the first light-emitting surface 632 and the second light-emitting surface 633 of the light guide plate 63 near the light source 64. In one embodiment, a reflector 632a can be disposed on the portion of the first light-emitting surface 632 of light guide plate 63 which is covered by the base 611, and a reflector 633a can be disposed on the portion of the second light-emitting surface 633 of the light guide plate 63 which is covered by the base 611, thereby increasing the light utilization efficiency of the light guide plate 63.

Referring to FIG. 11 and FIG. 12 again, the electrical connecting assembly 65 is disposed in the inner space B2 between the sidewall 611b and the inner space B2 and is connected to the light source 64 so as to form an electrical loop. Therefore, the electrical connecting assembly 65 of the lamp 60 not only can provide power required by the light source 64 itself, but also can be electrically connected to another electrical connecting assembly 65 of an adjacent lamp.

Figure 13:
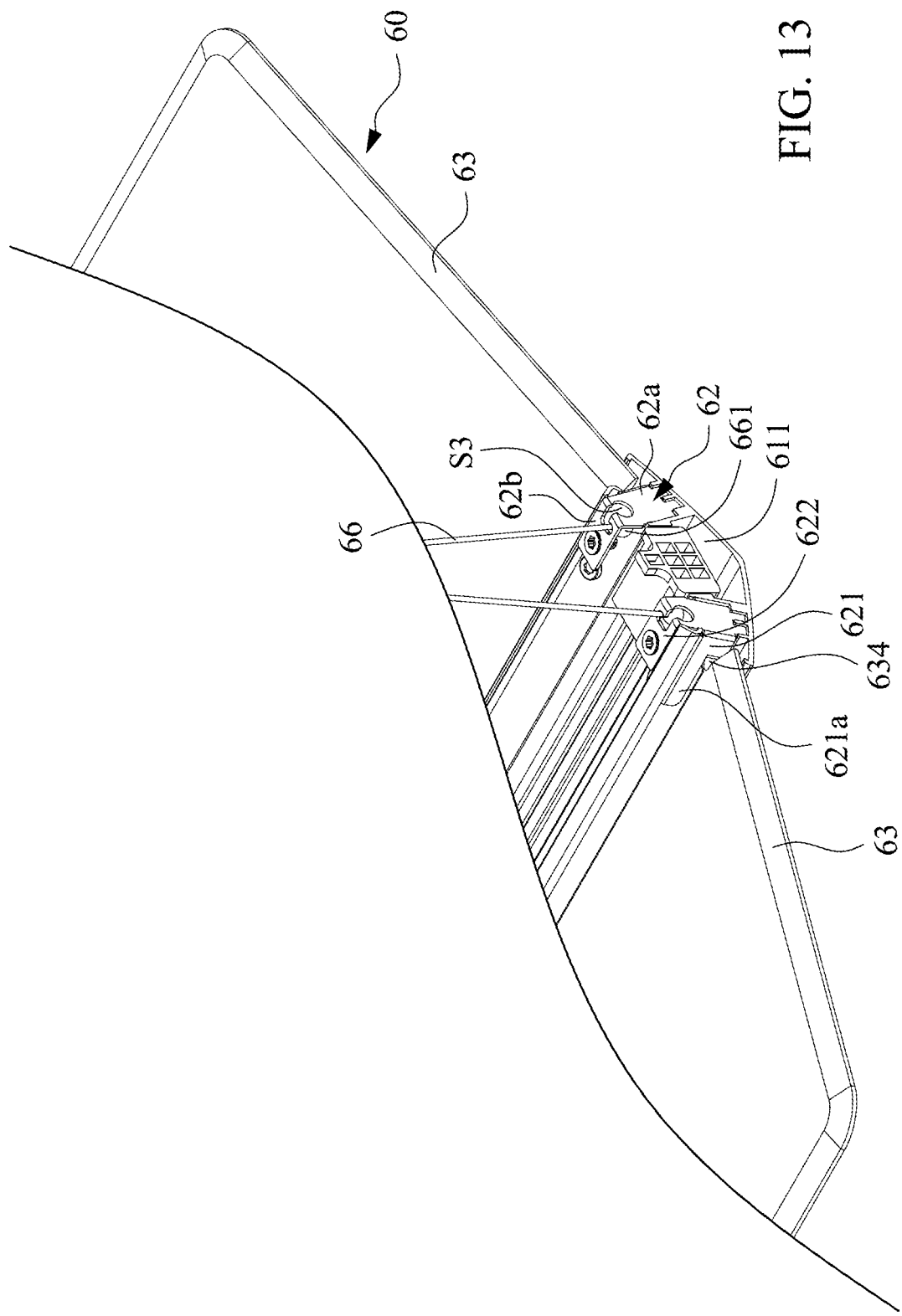
FIG. 13 is a partial schematic diagram showing the lamp omitting the upper cover in accordance with the second embodiment of the present invention.
Figure 14:
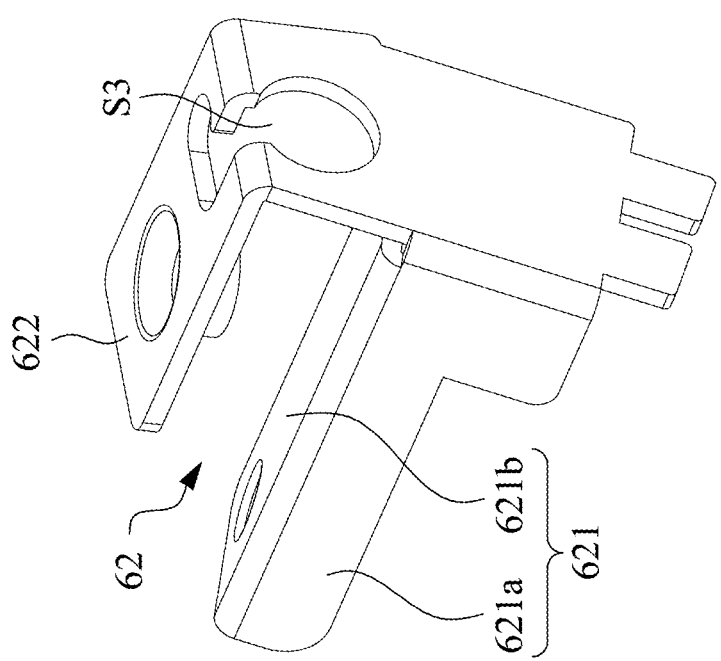
FIG. 14 is a schematic structural diagram showing a fixing mechanism in accordance with the second embodiment of the present invention.
Figure 14:
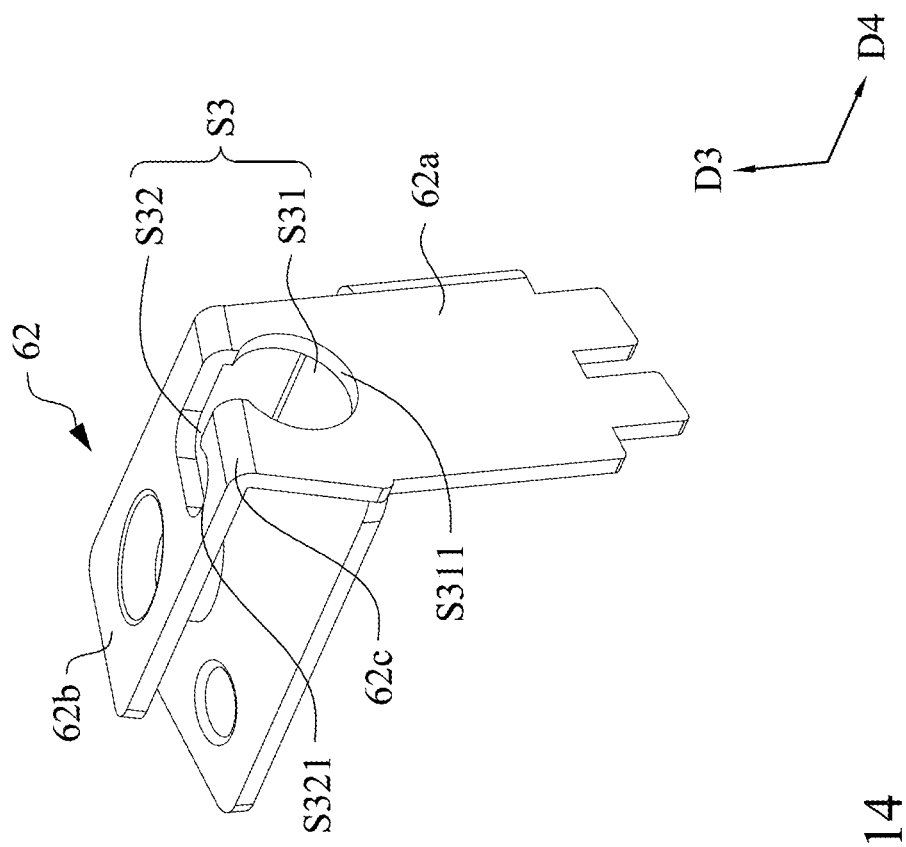

Simultaneously referring to FIG. 12 to FIG. 14, FIG. 13 is a partial schematic diagram showing the lamp omitting the upper cover 612 in accordance with the second embodiment of the present invention, and FIG. 14 is a schematic structural diagram showing the fixing mechanism 62 in accordance with the second embodiment of the present invention. In the present embodiment, the groove S3 is disposed on the fixing mechanism 62, and the fixing mechanism 62 is disposed on the base 611 of the frame body 61. The fixing mechanism 62 has a side surface 62a, a top surface 62b and the groove S3. The groove S3 is L-shaped and extends from the side surface 62a of the fixing mechanism 62 to the top surface 62b. As shown in FIG. 14, the groove S3 includes a first sub groove S31 and a second sub groove S32. The first sub groove S31 extends from a first end S311 which is located on the side surface 62a along a first direction D3 to a junction 62c between the side surface 62a and the top surface 62b, and the second sub groove S32 extends from a second end S321 which is located on the top surface 62b along a second direction D4 to the junction 62c. The first direction D3 is perpendicular to the second direction D4. The first sub groove S31 and the second sub groove S32 are communicated with each other at the junction 62c between the side surface 62a and the top surface 62b.

In addition, as shown in FIG. 11 and FIG. 13, a limiting block 661 is disposed on one end of the suspension member 66, in which a width of the first end S311 of the groove S3 is greater than a width of the limiting block 661, and a width of the second end S321 of the groove S3 is smaller than the width of the limiting block 661. Therefore, the at least one end of the suspension member 66 can be inserted into the groove S3 from the first end S311 on the side surface 62a of the fixing mechanism 62 and further be moved to the second end S321 on the top surface 62b of the fixing mechanism 62. Meanwhile, the suspension member 66 can be pulled down by the lamp due to the gravity of the lamp, and further, because the width of the limiting block 661 of the suspension member 66 is greater than the width of the second end S321 of the groove S3, the limiting block 661 of the suspension member 66 cannot escape upward and thus is limited on the top surface 62b of the fixing mechanism 62.

In the present embodiment, the fixing mechanism 62 can not only be used to position the suspension member 66, but also has a function of fixing the light guide plate 63. Referring to FIG. 12 to FIG. 14, the fixing mechanism 62 is F-shaped when viewed from the side surface, and the fixing mechanism 62 includes a first portion 621 and a second portion 622. As shown in FIG. 12, the first portion 621 of the fixing mechanism 62 is located in the lower channel B12, and the first portion 621 is configured to limit and position the light guide plate 63. The second portion 622 of the fixing mechanism 62 is located in the upper channel B11 and the groove S3 is disposed on the second portion 622. As shown in FIG. 13 and FIG. 14, the first portion 621 of the fixing mechanism 62 includes a first positioning portion 621a and a second positioning portion 621b. A surface of the first positioning portion 621a abuts against a top surface of the light guide plate 63 (for example, the second light-emitting surface 633), and a portion of the first positioning portion 621a is embedded in a recess 634 which is recessed on an end surface of the light guide plate 63. The second positioning portion 621b is configured to provide a fixing member F1 to pass therein so as to abut against the top surface of the light guide plate 63.

Figure 15:
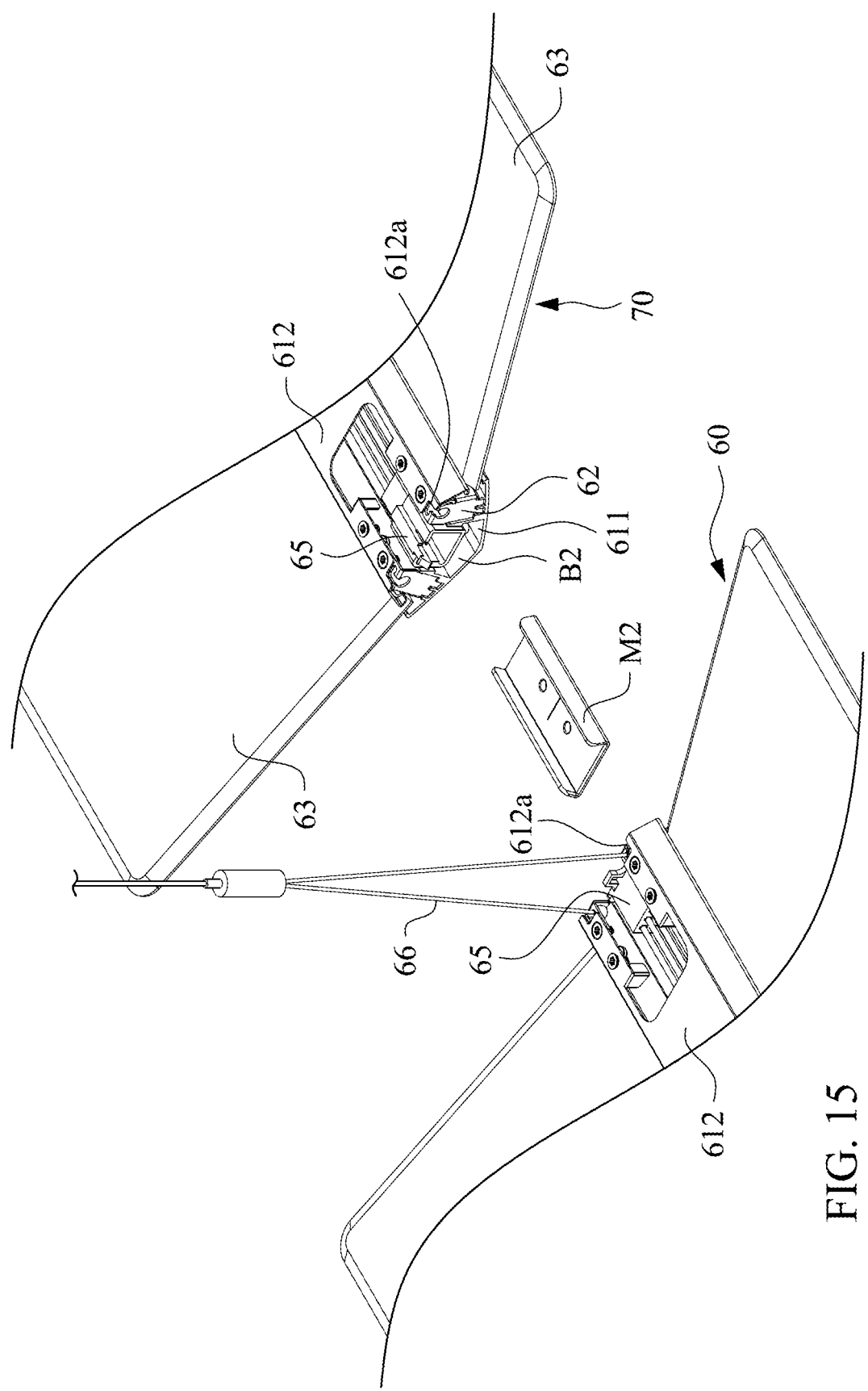
FIG. 15 is a partial schematic diagram showing the lamps to be jointed in accordance with the first embodiment of the present disclosure.

Simultaneously referring to FIG. 13 to FIG. 15, FIG. 15 is a partial schematic diagram showing the lamps to be jointed in accordance with the first embodiment of the present disclosure. It is noted that, the lamp 60 and the lamp 70 have substantially same structure. In the present embodiment, the lamp 60 is the first lamp (i.e. the endmost lamp). When the lamp 60 and the lamp 70 are connected together, the electrical connecting assembly 65 of the lamp 60 is connected to the electrical connecting assembly 65 of the lamp 70, and the electrical connecting assembly 65 of the lamp 60 is connected to an external power source. Therefore, the power provided by the external power source which is transmitted to the electrical connecting assembly 65 of the lamp 60 is further transmitted to the lamp 70. In other embodiments, if there is another lamp to be connected to the lamp 70, the power transmitted to the lamp 70 is further transmitted to the another lamp by the electrical connecting assembly 65. Therefore, only one external power source is used to provide power for multiple lamps instead of setting up multiple external power sources on each lamp, thereby forming a lamp with simple wiring structure as well as easy-to-assemble and time-saving advantages.

In addition, when the lamp 60 and the lamp 70 are connected in series, the fixing mechanism 62 of the lamp 60 is coupled to the fixing mechanism 62 of the lamp 70, and the groove S3 on the fixing mechanism 62 of the lamp 60 is communicated with the groove S3 on the fixing mechanism 62 of the lamp 70. Therefore, the suspension member 66 can be slid from the groove S3 of the lamp 60 to the groove S3 of the lamp 70. Therefore, by the design of the suspension member 66 which can be moved between two adjacent lamps, the assembling process between the suspension member and the lamp can be simplified while the lamps are connected in series or disassembled from each other.

In addition, most of the power boxes of hanging lamps are externally exposed and are directly installed on the ceiling, which results in a messy visual effect in a space. Some of power boxes which are disposed in the hanging lamps cannot be integrated with other internal structures, thus resulting in large volume and irregular appearance of the lamps. The present disclosure mainly uses the frame body and the fixing mechanism as a multifunctional structural member to simultaneously fix the upper cover, the lower cover, the light guide plate, and the suspension member, thereby forming an unimpeded central passage (i.e., the inner space) so as to provide a sufficient space to accommodate electrical wires and simplify the overall structure of the lamps.

Figure 16:
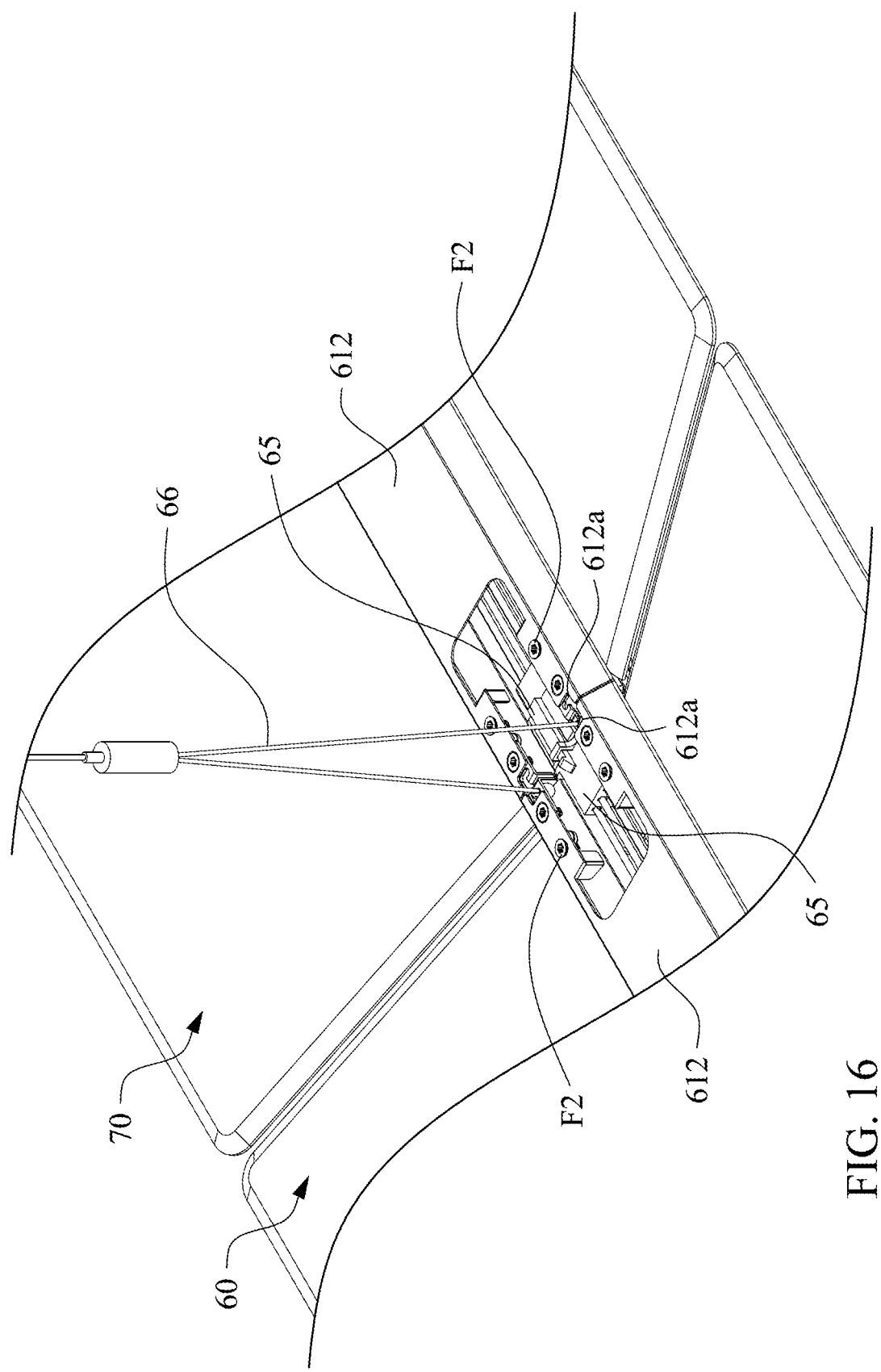
FIG. 16 is a schematic structural diagram showing the lamp system in the series-connection state in accordance with the second embodiment of the present invention.

Simultaneously referring to FIG. 11, FIG. 12 and FIG. 16, FIG. 16 is a schematic structural diagram showing the lamp system in the series-connection state in accordance with the second embodiment of the present invention. In the present embodiment, the upper cover 612 is used to cover the base 611, and the upper cover 612 is fixed on the fixing mechanism 62 which is disposed on the base 611. As shown in FIG. 12, in the present embodiment, the upper cover 612 can be fixed on the second portion 622 of the fixing mechanism 62 by fixing member F2. In one embodiment, the upper cover 612 has a notch 612a. As shown in FIG. 15 and FIG. 16, when the upper cover 612 is fixed to the fixing mechanism 62 on the base 611, the upper cover 612 covers the fixing mechanism 62 and a portion of the groove S3 can be exposed by the notch 612a, so that the suspension member 66 can pass through the groove S3 and further be limited in the notch 612a.

Referring to FIG. 13, FIG. 15 and FIG. 16, the present disclosure further provides a method for assembling a lamp system. The method mainly includes the following steps. At first, at least two aforementioned lamps, such as the lamp 60 and the lamp 70, are provided. Thereafter, the upper cover 612 of the lamp 60 and the upper cover 612 of the lamp 70 are removed. Then, the electrical connecting assembly 65 of the lamp 60 is coupled to the electrical connecting assembly 65 of the lamp 70 which is adjacent to the lamp 60, Thereafter, the suspension member 66 is moved from the groove S3 of the lamp 60 to the groove S3 of the lamp 70. It is noted that, while the electrical connecting assembly 65 of the lamp 60 is coupled to the electrical connecting assembly 65 of the adjacent lamp 70, the fixing mechanism 62 of the lamp 60 can be coupled to the fixing mechanism 62 of the lamp 70 at same time, so that the groove S3 on the fixing mechanism 62 of the lamp 60 can be communicated with the groove S3 on the fixing mechanism 62 of the lamp 70, and therefore the suspension member 66 can be slid from the groove S3 of the lamp 60 to the groove S3 of the lamp 70. Then, the upper cover 612 of the lamp 60 is covered on the base 611 and the fixing mechanism 62 of the lamp 60, and the upper cover 612 of the lamp 70 is covered on the base 611 and the fixing mechanism 62 of the lamp 70, so that the suspension member 66 is limited in the notch 612a of the upper cover 612 of the lamp 70, thereby forming the lamp system 50 as shown in FIG. 10. In addition, before coupling the lamp 60 to the lamp 70, as shown in FIG. 15, a supporting bar M2 can be inserted into the inner space B2 of the base 611 of the lamp 70. Therefore, when the fixing mechanism 62 of the lamp 60 is coupled to the fixing mechanism 62 of the lamp 70, one portion of the supporting bar M2 is inserted in the inner space B2 of the base 611 of the lamp 60, and the other portion of each of the supporting bar M2 is inserted in the inner space B2 of the base 611 of the lamp 70, thereby increasing an engagement stability between the lamp 60 and the lamp 70.

As shown in FIG. 12 and FIG. 15, In the present embodiment, the light guide plate 63 is disposed on a lower portion of the base 611, and a side surface of the light guide plate 22 which is near the adjacent lamp is aligned with a side surface of the fixing mechanism 62. Therefore, when the lamp 60 and the lamp 70 are connected together, the light guide plate 63 of the lamp 60 and the light guide plate 63 of the lamp 70 are continuously connected to each other. In other words, the first light-emitting surface 632 of the light guide plate 63 of the lamp 60 and the first light-emitting surface 632 of the light guide plate 63 of the lamp 70 are connected to form a continuous light-emitting surface, thereby improving the appearance of the lamp system and reducing dark areas.

Figure 17A:
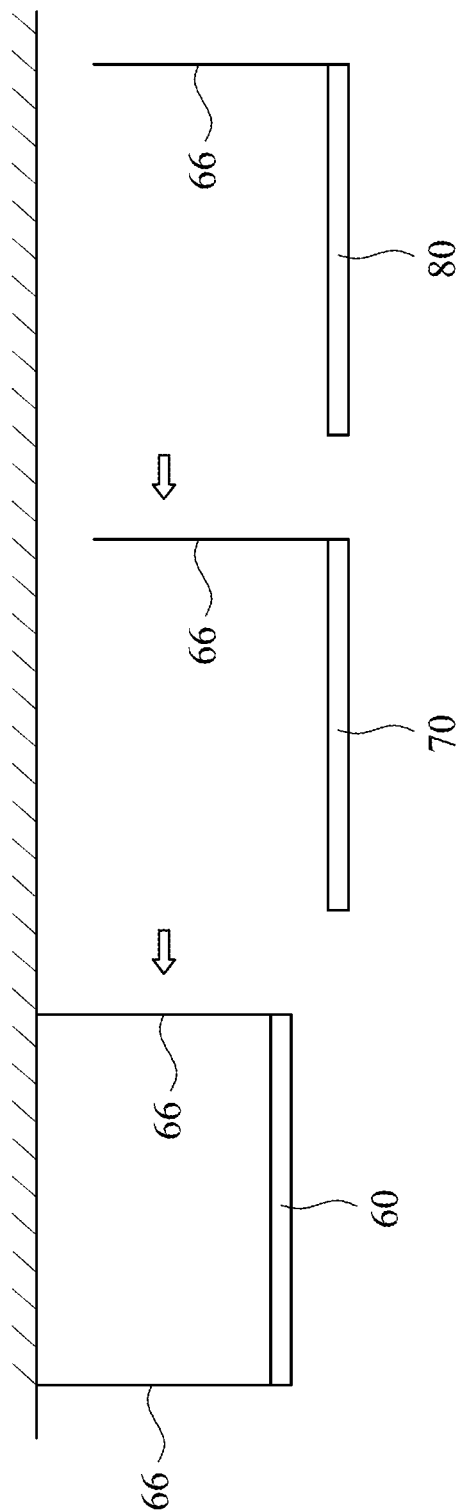
FIG. 17A is a schematic diagram showing an assembling process of a lamp system in accordance with the second embodiment of the present disclosure.

Referring to FIG. 15 and FIG. 17A, FIG. 17A is a schematic diagram showing an assembling process of a lamp system in accordance with the second embodiment of the present disclosure. When there is only one lamp 60 (i.e. the first lamp), two suspension members 66 are respectively disposed on two opposing sides of the lamp 60 so as to be fixed on the ceiling. When a second lamp (such as the lamp 70) needs to be additionally mounted, the aforementioned method for assembling the lamp system can be used to connect the lamp 70 to the lamp 60, and only one suspension member 66 is needed to be disposed on one side of the lamp 70 away from the lamp 60, in which the other side of the lamp 70 adjacent to the lamp 60 is connected to the lamp 20 by using the supporting bar M2 as shown in FIG. 15. More specifically, one portion of each of the supporting bar M2 is inserted in the inner space B2 of the base 611 of the lamp 60, and the other portion of each of the supporting bar M2 is inserted in the inner space B2 of base 611 of the lamp 70, thereby increasing an engagement stability between the lamp 60 and the lamp 70. Similarly, when a third lamp (such as the lamp 80) needs to be additionally disposed, the aforementioned method for assembling the lamp system also can be used to connect the lamp 80 to the lamp 70, and only one the suspension member 66 is need to be disposed on one side of the lamp 80 away from the lamp 70, in which the other side of the lamp 80 adjacent to the lamp 70 is connected to the lamp 60 by a supporting bar, thereby increasing an engagement stability between the lamp 70 and the lamp 80.

Figure 17B:
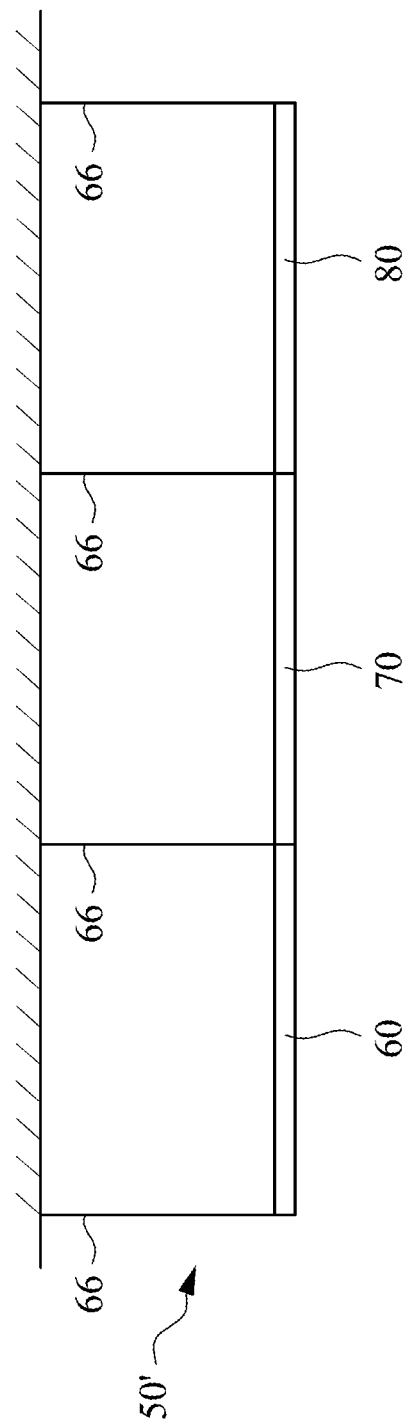
FIG. 17B is a schematic diagram showing the lamp system in an assembled state in accordance with the second embodiment of the present disclosure.

Referring to FIG. 15, FIG. 17B and FIG. 17C, FIG. 17B is a schematic diagram showing the lamp system in an assembled state in accordance with the second embodiment of the present disclosure, and FIG. 17C is a schematic diagram showing the lamp in a disassembled state in accordance with the second embodiment of the present disclosure. The present disclosure further provides another method for disassembling a lamp system. The method mainly includes the following steps. At first, a lamp system 50' shown in FIG. 17B is provided. Then, before the lamp 70 is disassembled, the suspension member 66 of the lamp 70 is moved from the groove of the lamp 70 to the groove of the lamp 80. Thereafter, the electrical connecting assemblies which located on two opposite sides of the lamp 70 are respectively separated from the electrical connecting assembly of the lamp 60 and the electrical connecting assembly of the lamp 80, thereby separating two opposing fixing mechanism the lamp 70 from the lamp 60 and the lamp 80 respectively. Then, the lamp 70 is removed so as to form two separated lamps (i.e. the lamp 60 and the lamp 80) as shown in FIG. 17C. By the lamp design of the present disclosure, the user can remove one of the lamps from the lamp system without additionally setting or removing another suspension member, thereby simplifying the overall lamp structure as well as simplifying the assembling and disassembling method.

According to the aforementioned embodiments of the present disclosure, the present disclosure uses the frame body to integrate the electrical connecting assembly inside the lamp and the suspension member, thereby simplifying the overall structure of the lamp as well as providing an easy-to-assemble (or easy-to-disassemble) way for users when multiple lamps need to be connected together or disassembled from each other.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp, comprising:
a frame body having an accommodating space;
at least one fixing mechanism disposed on the frame body, wherein the fixing mechanism has a side surface, a top surface and a groove, and the groove extends from the side surface to the top surface, wherein the groove has a first end and a second end, and the first end is located on the side surface, and second end is located on the top surface;
at least one light guide plate disposed in the accommodating space;
at least one light source disposed adjacent to a light-incident surface of the light guide plate;
an electrical connecting assembly disposed on the frame body, wherein the electrical connecting assembly is connected to the light source to form an electrical loop; and
at least one suspension member, wherein at least one end of the suspension member is passed through the groove from the first end which is located on the side surface of the fixing mechanism and is positioned in the second end which is located on the top surface of the fixing mechanism;
wherein only a portion of the light guide plate which is near the light-incident surface is located in the accommodating space, and the portion is covered by the frame body.

2. A lamp, comprising:
a frame body having an accommodating space;
at least one fixing mechanism disposed on the frame body, wherein the fixing mechanism has a side surface, a top surface and a groove, and the groove extends from the side surface to the top surface, wherein the groove has a first end and a second end, and the first end is located on the side surface, and second end is located on the top surface;
at least one light guide plate disposed in the accommodating space;
at least one light source disposed adjacent to a light-incident surface of the light guide plate;
an electrical connecting assembly disposed on the frame body, wherein the electrical connecting assembly is connected to the light source to form an electrical loop; and
at least one suspension member, wherein at least one end of the suspension member is passed through the groove from the first end which is located on the side surface of the fixing mechanism and is positioned in the second end which is located on the top surface of the fixing mechanism;
wherein the groove of the fixing mechanism comprises a first sub groove and a second sub groove, wherein
the first sub groove extends from the first end on the side surface along a first direction to a junction between the side surface and the top surface;
the second sub groove extends from the second end on the top surface along a second direction to the junction; and
the first direction is perpendicular to the second direction, and the first sub groove and the second sub groove are communicated with each other at the junction.

3. The lamp of claim 1, wherein
a limiting block is disposed on the at least one end of the suspension member; and
a width of the first end of the groove is greater than a width of the limiting block, and a width of the second end of the groove is smaller than the width of the limiting block.

4. A lamp, comprising:
a frame body having an accommodating space;
at least one fixing mechanism disposed on the frame body, wherein the fixing mechanism has a side surface, a top surface and a groove, and the groove extends from the side surface to the top surface, wherein the groove has a first end and a second end, and the first end is located on the side surface, and second end is located on the top surface;
at least one light guide plate disposed in the accommodating space;
at least one light source disposed adjacent to a light-incident surface of the light guide plate;
an electrical connecting assembly disposed on the frame body, wherein the electrical connecting assembly is connected to the light source to form an electrical loop; and
at least one suspension member, wherein at least one end of the suspension member is passed through the groove from the first end which is located on the side surface of the fixing mechanism and is positioned in the second end which is located on the top surface of the fixing mechanism;
wherein the accommodating space comprises an upper channel and a lower channel; and
wherein the fixing mechanism has a first portion and a second portion, the first portion is located in the lower channel, and the second portion is located in the upper channel, wherein the first portion is configured to position the light guide plate, and the groove is disposed on the second portion.

5. The lamp of claim 4, wherein the first portion of the fixing mechanism comprises a first positioning portion and a second positioning portion, wherein a surface of the first positioning portion abuts against a top surface of the light guide plate and a portion of the first positioning portion is engaged in a recess on an end surface of the light guide plate, and a fixing member is passed through the second positioning portion to abut against the top surface of the light guide plate.

6. The lamp of claim 4, wherein the frame body comprises an upper cover fixed on the second portion of the fixing mechanism, and the upper cover has a notch correspondingly covering a portion of the groove of the fixing mechanism.

7. The lamp of claim 4, wherein
the number of the at least one fixing mechanism is 2, and the number of the at least one light guide plate is 2, and the number of the at least one accommodating space is 2;
the frame body comprises a base, wherein the base has a carrying portion and two sidewalls, the sidewalls stand on the carrying portion, and the accommodating spaces are defined by the carrying portion and the sidewalls;
wherein a top portion is disposed on a top end of each of the sidewalls, and each of the top portions partitions each accommodating space into the upper channel and the lower channel; and wherein each of the accommodating spaces accommodates one of the light guide plates and one of the light sources.

8. The lamp of claim 1, wherein
the number of the at least one fixing mechanism is 2, and the number of the at least one light guide plate is 1, and the number of the at least one light source is 2;
wherein the frame body further comprises two side covers, and the side covers and the fixing mechanisms are combined together to form the accommodating space; and
wherein the light guide plate has two light-incident surfaces, and the light sources are respectively disposed in the side covers and are respectively disposed adjacent to the light-incident surfaces of the light guide plate.

9. A lamp system, comprising:
at least two lamps of claim 1;
wherein the fixing mechanism of one of the lamps is coupled to the fixing mechanism of another one of the lamps adjacent to the one of the lamps, and the groove of the fixing mechanism of the one of the lamps communicates with the groove of the fixing mechanism of the another one of the lamps;
wherein the electrical connecting assembly of the one of the lamps is connected to the electrical connecting assembly of the another one of the lamps; and
wherein the at least one end of the suspension member is slidable between the grooves of the adjacent fixing mechanisms.

10. The lamp system of claim 9, wherein the light guide plates of the lamps are continuously connected to each other.

11. The lamp system of claim 9, wherein
the electrical connecting assembly of an endmost one of the lamps is connected to an external power source; and
the electrical connecting assembly of each of the rest of the lamps is connected to the electrical connecting assembly of its adjacent lamp so as to form a connection with the endmost one of the lamps.

12. A method for disassembling a lamp system, comprising:
providing a lamp system, wherein the lamp system comprises at least two lamps, wherein each of the lamps comprises a frame body, at least one light guide plate, at least one light source, an electrical connecting assembly and at least one suspension member, wherein the at least one light guide plate is disposed in the frame body, and the at least one light source is disposed adjacent to a light-incident surface of the light guide plate, and the electrical connecting assembly is connected to the light source to form an electrical loop, and the suspension member is suspended in a groove of the frame body;
moving the suspension member out of the groove of one of the lamps desired to be disassembled into the groove of another one of the lamps adjacent to the one of the lamps;
separating the electrical connecting assembly of the one of the lamps from the electrical connecting assembly of the another one of the lamps; and
removing the one of the lamps.

13. A method for assembling a lamp system, comprising:
providing at least two lamps, wherein each of the lamps comprises a frame body, at least one light guide plate, at least one light source, an electrical connecting assembly and at least one suspension member, wherein the at least one light guide plate is disposed in the frame body, and the at least one light source is disposed adjacent to a light-incident surface of the light guide plate, and the electrical connecting assembly is connected to the light source to form an electrical loop, and the suspension member is suspended in a groove of the frame body;
connecting the electrical connecting assembly of one of the lamps to the electrical connecting assembly of another one of the lamps adjacent to the one of the lamps; and
moving the suspension member from the groove of the one of the lamps to the groove of the another one of the lamps.

14. The method for assembling the lamp system of claim 13, wherein at least one fixing mechanism is disposed on the frame body, wherein the fixing mechanism has a side surface and a top surface, and the groove extends from the side surface to the top surface, wherein the groove has a first end and a second end, and the first end is located on the side surface, and second end is located on the top surface, wherein the frame body of each of the lamps further comprises an upper cover corresponding to the fixing mechanism, and the upper cover has a notch covering a portion of the groove of the fixing mechanism;
after moving the suspension member from the groove of the one of the lamps to the groove of the another one of the lamps, the method further comprises covering the upper cover on the fixing mechanism so as to limit the suspension member in the notch of the upper cover of the another one of the lamps.

15. The method for assembling the lamp system of claim 13, wherein the frame body of each of the lamps has an inner space, before connecting the one of the lamps to the another one of the lamps adjacent to the one of the lamps, the method further comprises disposing a supporting bar between the inner spaces of the frame bodies of two adjacent lamps.

16. The lamp of claim 2, wherein
a limiting block is disposed on the at least one end of the suspension member; and
a width of the first end of the groove is greater than a width of the limiting block, and a width of the second end of the groove is smaller than the width of the limiting block.

17. The lamp of claim 2, wherein
the number of the at least one fixing mechanism is 2, and the number of the at least one light guide plate is 1, and the number of the at least one light source is 2;
wherein the frame body further comprises two side covers, and the side covers and the fixing mechanisms are combined together to form the accommodating space; and
wherein the light guide plate has two light-incident surfaces, and the light sources are respectively disposed in the side covers and are respectively disposed adjacent to the light-incident surfaces of the light guide plate.

18. The lamp of claim 4, wherein
a limiting block is disposed on the at least one end of the suspension member; and
a width of the first end of the groove is greater than a width of the limiting block, and a width of the second end of the groove is smaller than the width of the limiting block.

19. The lamp of claim 4, wherein
the number of the at least one fixing mechanism is 2, and the number of the at least one light guide plate is 1, and the number of the at least one light source is 2;

wherein the frame body further comprises two side covers, and the side covers and the fixing mechanisms are combined together to form the accommodating space; and wherein the light guide plate has two light-incident surfaces, and the light sources are respectively disposed in the side covers and are respectively disposed adjacent to the light-incident surfaces of the light guide plate.

\* \* \* \* \*